US008437037B2

(12) United States Patent
Broddin et al.

(10) Patent No.: US 8,437,037 B2
(45) Date of Patent: May 7, 2013

(54) MULTILEVEL CLUSTERED DOT SCREENING METHOD WITH IMPROVED DETAIL AND REDUCED IMAGE NOISE

(75) Inventors: Dirk Broddin, Terneuzen (NL); Wouter Boeckx, Veerle (BE); Stefaan Lippens, Ghent (BE)

(73) Assignee: Xeikon Manufacturing N.V., Lier (BE)

( * ) Notice: Subject to any disclaimer, the term of this patent is extended or adjusted under 35 U.S.C. 154(b) by 898 days.

(21) Appl. No.: 12/474,501

(22) Filed: May 29, 2009

(65) Prior Publication Data

US 2009/0296122 A1    Dec. 3, 2009

Related U.S. Application Data

(60) Provisional application No. 61/071,974, filed on May 29, 2008.

(51) Int. Cl.
*G06F 15/00* (2006.01)
*G06K 1/00* (2006.01)

(52) U.S. Cl.
USPC .......... 358/1.9; 358/3.06; 358/3.07; 358/3.26

(58) Field of Classification Search .......................... None
See application file for complete search history.

(56) References Cited

U.S. PATENT DOCUMENTS

| | | | |
|---|---|---|---|
| 5,155,599 A * | 10/1992 | Delabastita | 358/3.07 |
| 5,444,551 A | 8/1995 | Miller et al. | |
| 5,654,808 A | 8/1997 | Herregods et al. | |
| 5,766,807 A * | 6/1998 | Delabastita et al. | 430/6 |
| 5,903,713 A | 5/1999 | Daels et al. | |
| 6,249,355 B1 * | 6/2001 | Trask | 358/1.9 |
| 2002/0196310 A1 * | 12/2002 | Inoue | 347/43 |
| 2008/0117464 A1 | 5/2008 | Crounse | |

FOREIGN PATENT DOCUMENTS

| EP | A-768577 | 4/1997 |
|---|---|---|
| EP | 1 014 207 A1 | 6/2000 |

OTHER PUBLICATIONS

Delabastita, P.A., "Recent Trends in Digital Halftoning", Proceedings of SPIE, SPIE, USA, vol. 2949, Oct. 7, 1996, pp. 318-331, XP009006052, ISSN: 0277-786X, DOI: DOI: 10.1117/12.266335.
Extended European Search Report regarding European Patent Application No. 09161561.7, Apr. 28, 2011.
Kenneth R. Crounse, "Suppression of Automoiré in Multi-Level Supercell Halftone Screen Designs", *NIP23 and Digital Fabrication 2007*, pp. 201-204 (ISBN-0-89208-273-9).

(Continued)

*Primary Examiner* — Marivelisse Santiago Cordero
*Assistant Examiner* — Aaron R Gerger
(74) *Attorney, Agent, or Firm* — Bacon & Thomas, PLLC

(57) ABSTRACT

A method and a printing system are described capable of rendering more than 2 density levels at the device pixel level using precalculated rectangular screening tiles of finite size that define a spatially repetitive screening operation according to geometric clustered dot screen definitions for first, second and third separation screens that has the following characteristics: (A) the set of at least three separation screens is free of second order moiré; (B) the set of at least three separation screens consists of screens that have no internal moiré and/or screens that have a reduced sensitivity to amplification by process instability of any remaining level of intrinsic internal moiré; and (C) the screens have an optimized and balanced rosette structure leading to a reduction of visible patterning in overlays of the separation screens.

18 Claims, 19 Drawing Sheets

OTHER PUBLICATIONS

Yee S. NG et al., "Advances in Technology of KODAK NEXPRESS Digital Production Color Presses", *NIP23 and Digital Fabrication 2007*, pp. 489-493 (ISBN 0-89208-273-9).

J. Sullivan et al., "Design of Minimum Visual Modulation Halftone Patterns", *IEEE Transactions on Systems. Man, and Cybernetics*, vol. 21, n° 1, pp. 33-38, 1991.

Broddin at al., "Xeikon Digital Printing—Applications and Imaging Technology", 21$^{st}$ International Conference on Digital Printing Technologies, Final Program and Proceedings, Baltimore, MD, USA, Sep. 18, 2005, pp. 667-670, ISBN/ISSN: 0-89208-257-7.

R. Ulichney, "Digital Halftoning", The MIT Press, Cambridge, MA, pp. 52-60, 1987.

D. Lau and G. Arce, "Modern Digital Halftoning", Marcel Dekker, Inc., New York, NY, ISBN 0-8247-0456-8, pp. 279-305, 2001.

EPO Communication for European Patent Application 09 161 561.7, mailed Apr. 20, 2012 (4 pages).

\* cited by examiner

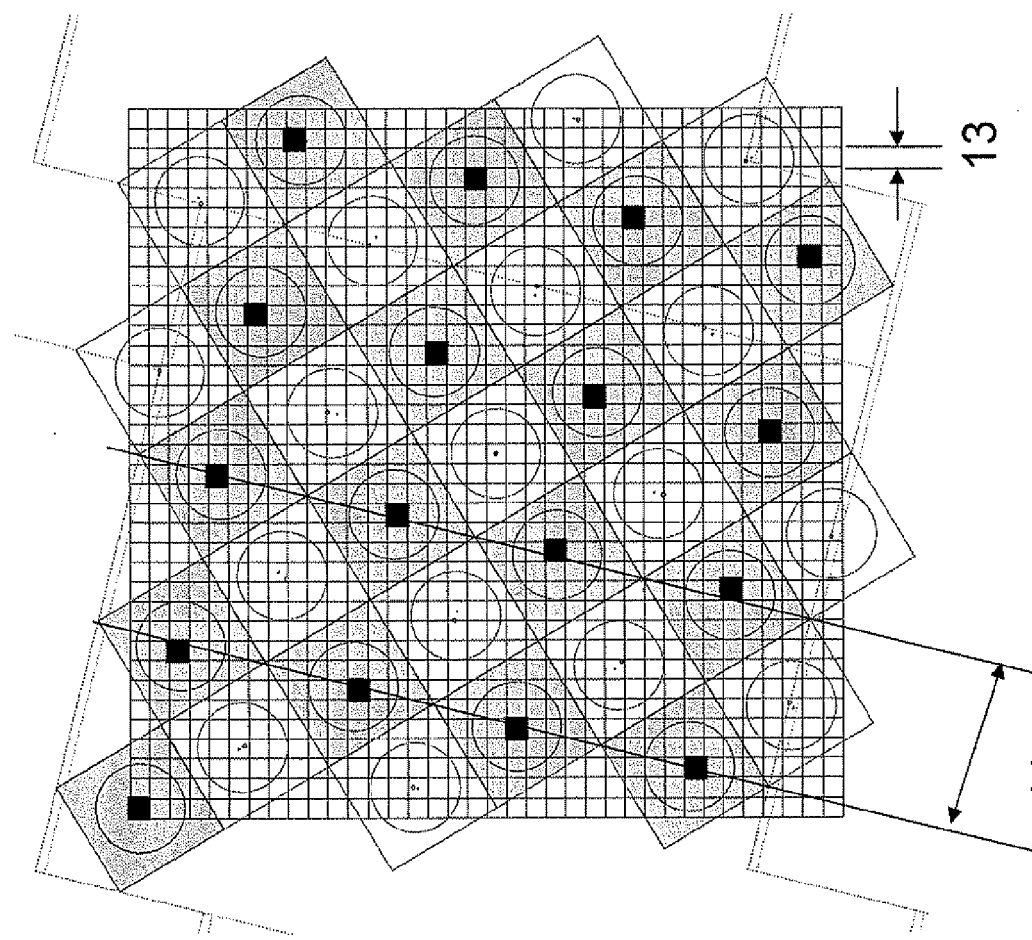

MULTILEVEL CLUSTERED DOT SCREENING METHOD WITH IMPROVED DETAIL AND REDUCED IMAGE NOISE

The present invention relates to apparatus and methods for screening for use in a printing system or process, e.g. for printed color reproduction of images on a digital printing system.

TECHNICAL BACKGROUND

U.S. Pat. No. 5,155,599 "Screening system and method for color reproduction in offset printing" describes a concept for generating sets of at least three halftone screens that are allegedly free from second order moiré. The concept is targeted at offset printing and flexographic printing systems and is discussed in the context of binary halftoning.

U.S. Pat. No. 5,155,599 deals with the optimal arrangement of at least three separation preangled screens in a supercell. The screening angles that are used are close, but not identical to conventional screening angles of 15 degrees, 45 degrees and 75 degrees. The reproduction is nevertheless free of second order moiré by the fact that the deviations in angles from the conventional system are exactly offset by the deviations in line rulings.

U.S. Pat. No. 5,155,599 is incorporated by reference in its entirety.

The concept of generating one of the prescreened tiles is briefly indicated using FIG. 1.

The screen angle and the spatial frequency of the dot modulation of the angled screens—also referred to as screen ruling—is expressed in the units of lpi (lines per inch) and is derived as $alfa = a\tan(A/B)$ $F = res*sqrt(A2+B2)/TS$ Where "res" is the spatial resolution of the imagesetter, which has evolved from 2400 dpi (dots per inch) in the 90's to over 4000 dpi presently.

The average number of recorder elements available for building each screen dot equals (Res/F)2. Due to the binary nature of the printing system and the requirement of more than 100, preferentially more than 200 graylevels, available the screen Res/F should be higher than 12 or more preferentially higher than 20 in order to be able to render 144 and 400 distinct levels respectively. Typically 256 levels are required by many printing applications and is a de facto industry standard. Preferably an excess of that should be available to allow tone curve adjustment. An example for 2400 dpi imagesetters is therefore, typically around 120-140 lpi.

Digital printing systems, such as electrographic digital printing systems and ink jet based digital printing systems may have a more restricted spatial resolution of less than 2400 dpi or 3600 dpi such as for example 600 dpi or 800 dpi or even 1200 dpi.

Modern expectations for screens in high quality printing are to have the option to select screen rulings of 200 lpi. Methods used in offset for generating high resolution screens cannot be readily carried over to digital print technologies, however, as 10-15 micron features cannot be stably printed in these technologies at the present time.

Whereas the offset printing system is binary—either there is a laydown of ink or there is no laydown of ink—for a given addressable position on the print medium, these digital printing systems may be capable of rendering multiple density levels for each addressable position on the print medium. The typically lower device resolution is compensated for to a certain extent by the multiple density resolution capability.

There remains a need for screening concepts that are specifically tuned to the capabilities and limitations of digital printing systems such as digital printing systems that are based on electrophotography.

FIG. 2 shows a simplified representation of how a clustered dot screen rendering for a given input grayscale value in binary printing at a higher device resolution (12), can be converted to a lower resolution (13) representation with multiple density capability at the device pixel level. The screen ruling in FIG. 2 is indicated by the reference number 11.

FIG. 3 shows an example of how a prescreened tile with A=2, B=2, TS=11 can be generated according to the principle of FIG. 2, which is sometimes referred to as a box-filter. A square screen tile (40) comprises 8 clustered dots in a square arrangement with a screen angle of 45 degrees. Target dot centers (15) are indicated by circles. The device grid with resolution (13) is indicated by the grid lines. Target dot centers 15, 16 and 17 have a different relative position with respect to the intersections of the device grid lines.

FIG. 4 shows a pattern as obtained after screening a uniform grayscale area with a grayscale value of 80% for a box filter approach of the geometry of FIG. 3 (100% being white, 0% being black). The repeating screen tile 40 is indicated in the representation of the screened image in FIG. 4. Note that clustered dot configurations 15b, 16b and 17b are quite different in terms of the occurrence of different values for the density levels of the contributing pixels.

It has been found from experiments with electrographic digital printing systems that the density contribution of dot configurations such as 17b is far less stable than the density contribution of dot configurations such as 16b.

Especially electrophotographic digital printing systems using toner development assisted by a superimposed alternating electric field (AC) such as the Canon Imagepress V7000 and the dual component (AC) assisted development in the Xeikon 5000 and Xeikon 6000 printers have a highly non-linear development process. Donor roll development, as used in the Xerox Igen3 digital press, also has a highly non-linear development process.

It is claimed that the rotating magnetic brush development system utilized in the Nexpress 2100 system and the Nexpress S3000 system has an intrinsic capability to develop a continuous tone representation without introducing a screen—see FIG. 13 and the discussion on page 491 of Satellite images in "Advances in Technology of KODAK NEXPRESS Digital Production Presses" in NIP23 and Digital Fabrication 2007, pages 489-493 published in 2007 by IS&T (ISBN 0-89208-273-9).

The Nexpress 2100 system has typically been using screens for its black printing as in FIG. 3, where the screening method can be similar in grayscale characteristics to that of a simple box-filter. The most popular screen that is made available for printing the black separation on the Nexpress 2100 is the 155 lpi screen with a 45 degrees screen angle and corresponds more or less to the configuration of FIG. 3 for a device resolution (13) of 600 dpi.

Box filters calculations are lightweight and can be used for screen calculation on the fly as with irrational tangent screening.

Experiments have shown that screens as in FIG. 3 give rise to poor results in electrophotographic digital printers that utilize alternating current bias assisted dual component magnetic brush development. The density contribution of dot configurations such as 17b in FIG. 4 are found to vary significantly with minor changes of the development setup that can result from environmental changes, wear of components, cleanliness of engine parts and the aging of the consumables. As the varying of the density contribution of dot configurations such as (16b) is different and generally far less than the varying of the density contribution of the dot configuration (17b) such changes in the print conditions will generally give rise to observable patterns at low spatial frequencies that can ultimately get as low as the repeat frequency of the entire screen tile (40) (55 lpi for FIG. 3 at 600 dpi device resolution). Whereas the eye does not pick up the 155 lpi modulation from normal viewing distances, the lower frequency patterns resulting from unwanted 55 lpi modulation are easy to pick up by an observer.

As these low frequency patterns result from how the cluster dot formation is affected by the device grid, this type of unwanted low frequency modulation will be referred to as due to an intrinsic internal moiré effect that is amplified by process instability.

Similar issues of amplification of an intrinsic internal moiré can be expected with donor roll development where thin wires in the development gap induce AC fields that lead to a steep and non-linear development curve as is used in the Igen3 model of Xerox Corporation. Liquid toner development is also known to have a nonlinear development curve.

Approaches to minimize and control the use of "unstable levels" in the design of multilevel screening algorithms have been discussed in amongst others U.S. Pat. Nos. 5,444,551, 5,903,713 and 5,654,808.

Earlier attempts to take the concept of U.S. Pat. No. 5,155,599 to digital printing systems have been only partly successful. The Xeikon DCP family including the more recent Xeikon 6000 printing system has been providing 170 lpi on a 600 dpi device with the black screen under 45 degrees being sensitive to an intrinsic internal moiré effect that is amplified by process instability with a resulting frequency at 120 lpi.

Japanese copier and printer manufacturers have focused on the use of simple rational screens with a small repeat cell including sets with a black separation at 212 lpi, 45 degrees and additional separations under screen angles of 18 degrees and 72 degrees. Such screens have a small rectangular repeat structure for the overprint of the three separations. The images lack the symmetry of the conventional "rosette structure" which is obtained when the screen angles of the separations screens approach the 30 degrees rotation that is typical for screensets that approach the angles of a conventional set of 30 degrees rotated screens.

It has now been found that the perception of overprint patterns is highly reduced when the screen ruling is increased. For a given screen ruling a further reduction in the perceived level of overprint patterns was found the more the classical isotropic "rosette structure" as known from conventional 30 degrees rotated clustered dot screens is approached.

Screening approaches as in the HP Indigo 5500 are based on square screen tiles. Oversized dots are used and highlight areas are screened using large square screen tiles with randomized dot positions. Screen configurations in the midtones approach the conventional dot structure of 30 degrees rotated screens. The rosette structure evolves from a clear centered to a dot centered within a page indicating that the rosette is shifting and not locked in the terminology of U.S. Pat. No. 5,155,599.

SUMMARY OF THE INVENTION

The present invention provides a better screening system for printed reproduction of images on a digital printing system.

In one aspect, the present invention provides a method and a printing system capable of rendering more than 2 density levels at the device pixel level using precalculated rectangular screening tiles of finite size that define a spatially repetitive screening operation according to geometric clustered dot screen definitions for first, second and third separation screens that has the following characteristics.

(A) the set of at least three separation screens is free of second order moiré

(B) the set of at least three separation screens consists of screens that have no internal moiré and/or screens that have a reduced sensitivity to amplification by process instability of any remaining level of intrinsic internal moiré

(C) the screens have an optimized and balanced rosette structure leading to a reduction of visible patterning in overlays of the separation screens.

In accordance with one embodiment of the present invention a screening system for printed reproduction of images on a digital printing system is provided capable of rendering more than 2 density levels, e.g. capable of rendering more than 4 density levels, at the device pixel level using precalculated rectangular screening tiles that define a spatially repetitive screening operation according to geometric clustered dot screen definitions for first, second and third separation screens (or more), said first, second and third separation screens (or more) having different screen angles and each having rulings with at least two of the screen rulings being different by a finite amount and with at least one vector sum of two frequency components of one pair of screens being equal to at least one frequency component of the other screen or to a multiple or submultiple of said at least one frequency component of the other screen, in which at least one of said three separation screens is simple rational, meaning that all the target positions for the centers of clustered dots for that separation screen have an identical relative position with respect to the device grid of addressable pixel positions, wherein the angular relation between said three screens is equivalent by (an optional) rotation of the entire screening system to the angular relation of a system of three screens with screen angles at 15 degrees+delta1, 45 degrees+delta2, 75 degrees+delta3, with delta1, delta2, delta3 when expressed in degrees satisfying the relations

|delta 1|<1 degree,

|delta 2|<1 degree,

|delta 3|<1 degree, e.g.

|delta 1|<0.3 degree,

|delta 2|<0.3 degree,

|delta 3|<0.3 degree,

The screening operation for each of said three separation screens preferably converts an image representation for a region comprising a continuous tone value for the given separation channel into a screened image representation value for the given separation channel with the specific density value out of the available more than 2 density values, e.g. 4 or more density values, for each addressable pixel position to be rendered, said screened image representation for said continuous tone value satisfying the constraint that when averaged over the pixels for that specific region more than 70% of the pixels has the minimum or the maximum density level of said more than 2 density values, e.g. 4 or more density values.

The screen rulings of each of said three separation screens preferably satisfy the constraint device resolutions/8<screen ruling<device resolution/4

The present invention also provides a screening method for printing images on a digital printing system capable of rendering more than 2 density levels at the device pixel level using precalculated rectangular screening tiles that define a spatially repetitive screening operation according to geometric clustered dot screen definitions for first second and third separation screens (or more), said first, second and third separation screens (or more) being adapted so they have different screen angles and each having rulings with at least two of the screen rulings being set so that they are different by a finite amount and with at least one vector sum of two frequency components of one pair of screens being equal to at least one frequency component of the other screen or to a multiple or submultiple of said at least one frequency component of the other screen, at least one of said three separation screens being made simple rational, meaning that all the target positions for the centers of clustered dots for that separation screen have an identical relative position with respect to the device grid of addressable pixel positions, wherein the angular relation between said three screens is set to be equivalent by (an optional) rotation of the entire screening system to the angular relation of a system of three screens with screen angles at 15 degrees+delta1, 45 degrees+delta2, 75 degrees+delta3, with delta1, delta2, delta3 when expressed in degrees satisfying the relations

|delta1|<1 degree,

|delta2|<1 degree,

|delta3|<1 degree, e.g.

|delta1|<0.3 degree,

|delta2|<0.3 degree,

|delta3|<0.3 degree,

The screening operation for each of said three separation screens preferably converts an image representation for a region comprising a continuous tone value for the given separation channel into a screened image representation value for the given separation channel with the specific density value out of the available more than 2 density values, e.g. more than 4 density levels for each addressable pixel position to be rendered, said screened image representation for said continuous tone value satisfying the constraint that when averaged over the pixels for that specific region more than 70% of the pixels has the minimum or the maximum density level of said more than 2 density values, e.g. more than 4 density levels.

The screen rulings of each of said three separation screens may satisfy the constraint device resolution/8<screen ruling<device resolution/4.

The present invention also provides a digital printing system capable of rendering more than 2 density levels at the device pixel level using precalculated rectangular screening tiles that define a spatially repetitive screening operation according to geometric clustered dot screen definitions for first, second and third separation screens and adapted to provide the screening system as described above.

For print systems allowing the use of more than three separations for use in combination with a fourth toner or ink as in CMYK printing, or for use in systems with five separations as in the Xeikon and Nexpress digital color presses that are equipped with five printing stations or for use in printing systems with more than five printing stations, e.g. 8 printing stations, different approaches can be used for a screening method using precalculated rectangular screening tiles of finite size for such optional fourth, fifth, sixth or higher separation in addition to three screen definitions with the preferred properties as described above.

The additional screening method for an additional colorant or ink can re-use the geometry of one of the at least three screens that are already in use. An additional green separation can for example re-use the geometry of a screen that is used for a magenta screen. Such an approach makes especially sense in accordance with an embodiment of the present invention when the color separation strategy is a method that avoids the simultaneous use of any significant amount of green and magenta in any area of the images to be separated, or uses this strategy only in areas of the image where there is little simultaneous use of any significant amount of green and magenta.

In an alternative embodiment a screening approach is used having precalculated rectangular screening tiles of finite size that is not based on a repetitive square grid clustered dot structure, such as screen systems based on generalizations of green noise masks (Modern Digital Halftoning—D. Lau and R Arce-Marcel Dekker Inc. New York—Basel ISBN 0-8247-0456-8) or multilevel implementations of such screens lacking a regular square grid dot structure such as Kodak Nexpress Stacato DX screening as described in the Technical program and Proceedings of 23th International Conference on Digital Printing Technologies/Digital Fabrication 2007 Anchorage Ak. Sep. 16-21 2007—Society for Imaging Technology (IS&T) and the Imaging Society of Japan (ISJ) page 489-492)

Use of such non-square clustered dot screens for the yellow screen is a preferred option in accordance with an embodiment of the present invention to complement a set of more than three separations where at least three of the screen separations are according to claim 1.

Four color printing with Cyan Magenta, Yellow and Black is a good example where as further a non-limiting example of an embodiment of the present invention, the screens for cyan, magenta and Black are according to claim 1 while the yellow screen can be based on such screening approach that is not based on a repetitive square grid clustered dot structure.

Another preferred embodiment for the screening geometry for a fourth screen in four or more colour printing is based on an additional clustered dot screen that complements the (optionally rotated) screenset where three screens take the traditional angular relationship of 15 degrees, 45 degrees and 75 degrees with a fourth screen under a angle of 0 degrees.

Preferentially, this fourth screen is also a rectangular dot screen or a square dot screen. A square dot screen at 0 degrees for complementing a set of three screens at 15 degrees, 45 degrees and 75 degrees words very well when a screen frequency is used that is different from the screen frequency of the screen of 45 degrees by X % with 3<X<50.

Accordingly, the present invention provides a screening system for printed reproduction of images on a digital printing system capable of rendering more than 2 density levels at the device pixel level using precalculated rectangular screening tiles that define a spatially repetitive screening operation according to geometric clustered dot screen definitions for first, second, third and fourth separation screens, said first, second, third and fourth separation screens having different screen angles and each having first, second third and fourth rulings (ruling1, ruling 2, ruling3 and ruling 4) with at least two of the screen rulings being different by a finite amount and with at least one vector sum of two frequency components of one pair of screens being equal to at least one frequency component of the other screen or to a multiple or submultiple of said at least one frequency component of the other screen, in which at least one of said four separation screens is simple rational, meaning that all the target positions for the centers of clustered dots for that separation screen have an identical relative position with respect to the device grid of addressable pixel positions, wherein the angular relation between said four screens is equivalent by (an optional) rotation of the entire screening system to the angular relation of a system of three screens with screen angles at 15 degrees+delta1, 45 degrees+delta2, 75 degrees+delta3, 0 degrees+delta4 with delta1, delta2, delta3, delta4 when expressed in degrees satisfying the relations

|delta1|<1 degree, |delta2|<1 degree,

|delta3|<1 degree, |delta4|<1 degree.

From this the present invention also provides a square dot screen at 0 degrees for complementing a set of three screens at 15 degrees, 45 degrees and 75 degrees. This works very well when a screen frequency is used that is different from the screen frequency of the screen of 45 degrees by X % with 3<X<50.

Preferably the fourth ruling (Ruling4)=the second ruling (Ruling2)*X with 1.03<X<1.50 and the fourth ruling (Ruling4)=the second ruling (ruling2)*M/(N*sqrt(2)) with N being an integer <10, and M being an integer <10.

The screen set comprising such four screens with screen angles at 15 degrees, 45 degrees, 75 degrees and 0 degrees can be rotated as a whole over a arbitrary angle This relation allows to derive a new enlarged supercell derived from the smaller supercell from the 3 screens geometry as in FIG. 15.

In the limit case with M=N=1, the deviation in screen ruling is 41% and the supercell that fits the interaction of the four screens has the same size as the supercell that fits the interaction of the first three screens. This approach has the benefit that the periodicities resulting from the interaction between the separations can not have a lower frequency than the initial supercell that fits the interaction of the first three screens. It is less preferred however as the interaction between the 45 degrees screen and the 0 degree screen is found to depend an a relative phase shift of these two screens as induced for example by misregistration errors resulting from fluctuations in the real life printing presses.

It is therefore more preferred that the fourth ruling (Ruling4)=the second ruling (Ruling2)*X with 1.03<X<1.25 and the fourth ruling (Ruling4)=the second ruling (ruling2)*M/(N*sqrt(2)) with N being an integer >1 and <10, M being an integer >1 and <10.

An example of a non-rotated set with an fourth separation according to the features above is given ion the table below and complements the three screen set geometry is given below (line 8 of table 2—see Appendix of Tables below):
Cyan 14.93 degrees—169.35 lpi
Magenta 75.07 degrees—169.35 lpi
Yellow 0 degrees—180 lpi
Black 45 degrees—169.71 lpi
For this example X=6.51% and M=3, N=2.

An example of a rotated set with an fourth separation according to the features above is given ion the table below and complements the three screen set geometry is given below (line 8 of table 4 and FIG. 19):
Cyan 21.27 degrees—187.02 lpi
Magenta 81.41 degrees—187.02 lpi
Yellow 6.34 degrees—198.78 lpi
Black 51.34 degrees—187.41 degrees.
For this example X=6.51% and M=3, N=2

Accordingly the present invention provides a screening method for printed reproduction of images on a digital printing system capable of rendering more than 2 density levels at the device pixel level using precalculated rectangular screening tiles that define a spatially repetitive screening operation according to geometric clustered dot screen definitions for first, second, third and fourth separation screens, said first, second, third and fourth separation screens having different screen angles and each having first, second, third and fourth rulings (ruling1, ruling2, ruling3 and ruling4) with at least two of the screen rulings being different by a finite amount and with at least one vector sum of two frequency components of one pair of screens being equal to at least one frequency component of the other screen or to a multiple or submultiple of said at least one frequency component of the other screen, in which at least one of said four separation screens is simple rational, meaning that all the target positions for the centers of clustered dots for that separation screen have an identical relative position with respect to the device grid of addressable pixel positions, wherein the angular relation between said four screens is equivalent by (an optional) rotation of the entire screening system to the angular relation of a system of three screens with screen angles at 15 degrees+delta1, 45 degrees+delta2, 75 degrees+delta3, 0 degrees+delta4 with delta1, delta2, delta3, delta4 when expressed in degrees satisfying the relations

|delta1|<1 degree, |delta2|<1 degree,

|delta3|<1 degree, |delta4|<1 degree.

The present invention is preferably implemented in a processor or computer based digital printing system. Accordingly, the present invention provides a software product that implements a screening system for printed reproduction of images when executed on a processor-based a digital printing system capable of rendering more than 2 density levels at the device pixel level using precalculated rectangular screening tiles that define a spatially repetitive screening operation according to geometric clustered dot screen definitions for first, second and third separation screens, the software being adapted so that said first, second and third separation screens have different screen angles and each has rulings with at least two of the screen rulings being different by a finite amount and with at least one vector sum of two frequency components of one pair of screens being equal to at least one frequency component of the other screen or to a multiple or submultiple of said at least one frequency component of the other screen, in which at least one of said three separation screens is simple rational, meaning that all the target positions for the centers of clustered dots for that separation screen have an identical relative position with respect to the device grid of addressable pixel positions, wherein the angular relation between said three screens is equivalent by (an optional) rotation of the entire screening system to the angular relation of a system of three screens with screen angles at 15 degrees+delta1, 45 degrees+delta2, 75 degrees+delta3, with delta1, delta2, delta3 when expressed in degrees satisfying the relations

|delta 1|<1 degree,

|delta 2|<1 degree,

|delta 3|<1 degree.

The present invention also provides a software product that implements screening system for printed reproduction of images when executed on a processor-based digital printing system capable of rendering more than 2 density levels at the device pixel level using precalculated rectangular screening tiles that define a spatially repetitive screening operation according to geometric clustered dot screen definitions for first, second, third and fourth separation screens, the software being adapted so that said first, second, third and fourth separation screens having different screen angles and each having first, second, third and fourth rulings (ruling1, ruling2, ruling3 and ruling4) with at least two of the screen rulings being different by a finite amount and with at least one vector sum of two frequency components of one pair of screens being equal to at least one frequency component of the other screen or to a multiple or submultiple of said at least one frequency component of the other screen, in which at least one of said four separation screens is simple rational, meaning that all the target positions for the centers of clustered dots for that separation screen have an identical relative position with respect to the device grid of addressable pixel positions, wherein the angular relation between said four screens is equivalent by (an optional) rotation of the entire screening system to the angular relation of a system of three screens with screen angles at 15 degrees+delta1, 45 degrees+delta2, 75 degrees+delta3, 0 degrees+delta4 with delta1, delta2, delta3, delta4 when expressed in degrees satisfying the relations

|delta1|<1 degree, |delta2|<1 degree,

|delta3|<1 degree, |delta4|<1 degree.

A machine readable signal storage media may store any of the software products of the present invention.

The present invention also provides a printed medium printed with an image derived from an output of any of the screening methods of the present invention or an output of any of the screening systems of the present invention when operated as a digital printing system.

Individual embodiments of the present invention are described below in more detail and are defined in the attached claims.

BRIEF DESCRIPTION OF THE FIGURES

FIG. 10 shows a configuration of a pre angled screen in a tile with TS=36, A=1, B=4. FIG. 10 shows the equivalent screen at 1200 dpi of the 600 dpi screen in FIG. 5.

FIG. 17 shows examples for a 1200 dpi system.

FIG. 19 shows a typical preferred rosette configuration where the angle error is smaller than 0.1 degrees.

FIG. 20 shows an analysis of visible patterning and image noise for a variety of "hard" screens with a screen angle of 45 degrees with screen rulings at 170 lpi, 190 lpi, 212 lpi and 233 lpi on a Xeikon 6000 toner based electrophotographic engine equipped with 1200 dpi. FIG. 21 shows the analysis of visible patterning and image noise for a viewing distance of 250 mm for the same printouts as in FIG. 20. FIG. 22 shows examples for a 1200 dpi system,

DETAILED DESCRIPTION OF THE PREFERRED EMBODIMENTS

Figure 1:
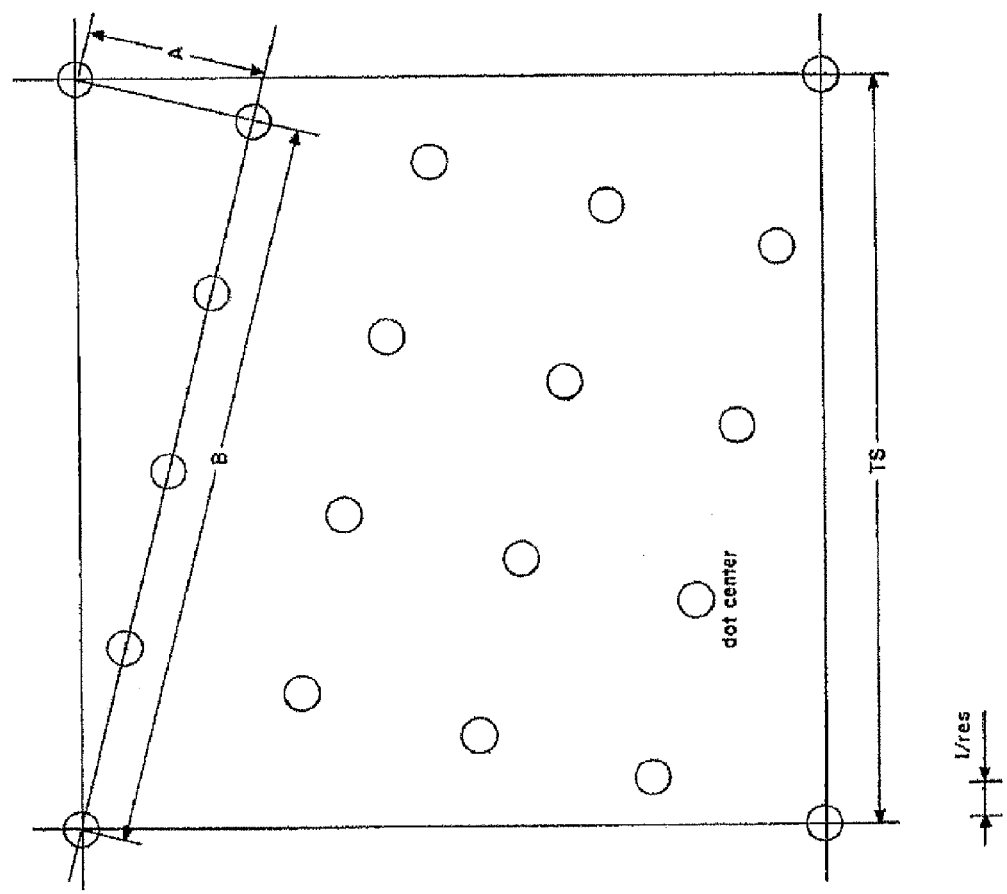
FIG. 1 illustrates the concept of generating a prescreened tile.
Figure 2:
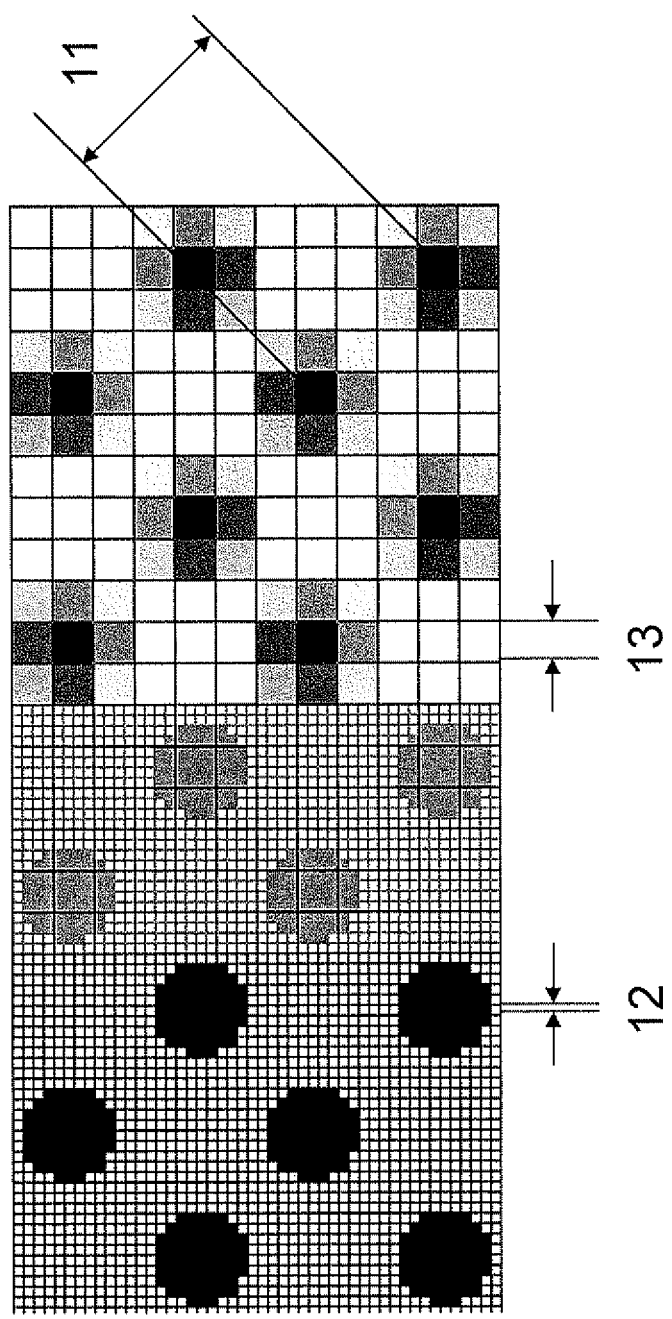
FIG. 2 shows a simplified representation of how a clustered dot screen rendering for a given input grayscale value in binary printing at a higher device resolution (12), can be converted to a lower resolution (13) representation with multiple density capability at the device pixel level. The screen ruling in FIG. 2 is indicated by the reference number 11.
Figure 3:
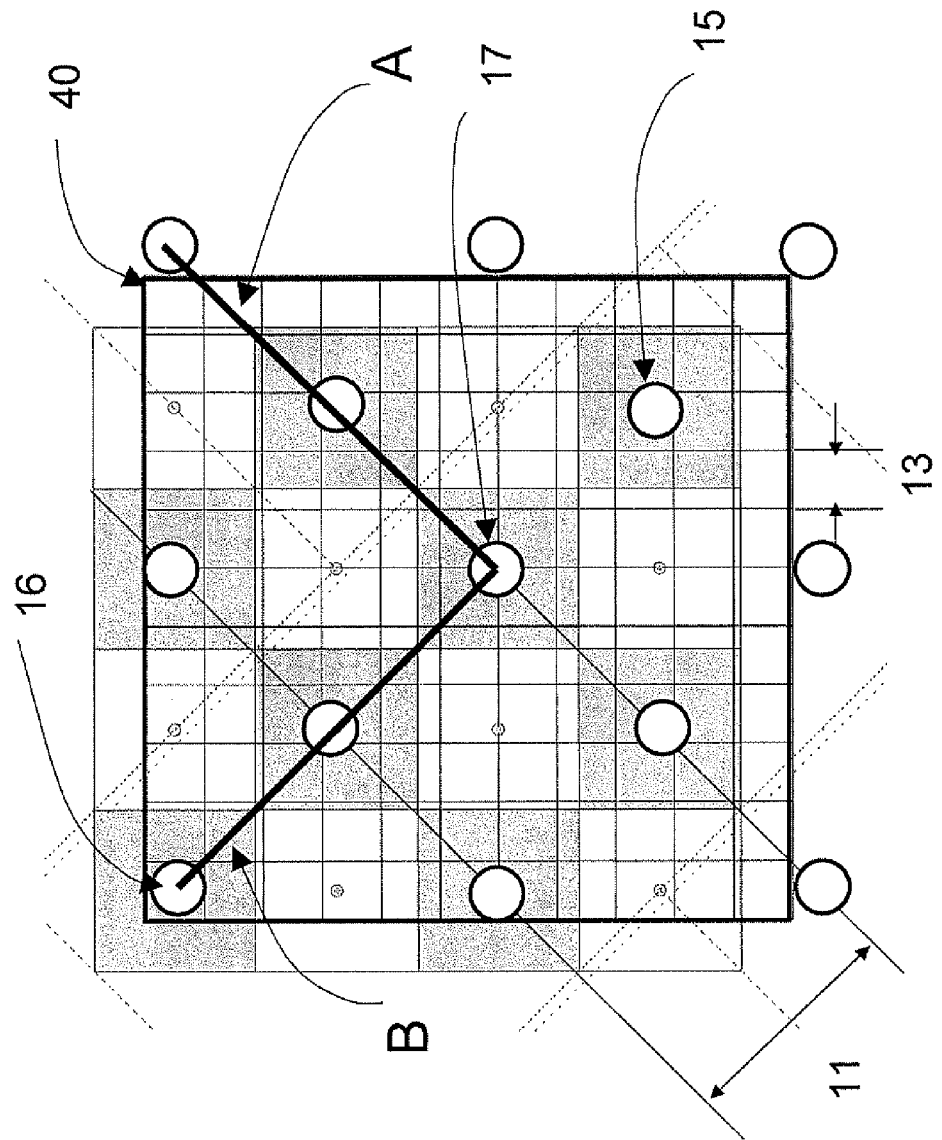
FIG. 3 shows an example of how a prescreened tile with A=2, B=2, TS=11 can be generated according to the principle of FIG. 27 which is sometimes referred to as a box-filter. A square screen tile (40) comprises 8 clustered dots in a square arrangement with a screen angle of 45 degrees. Target dot centers (15) are indicated by circles. The device grid resolution (13) is indicated by the grid lines. Target dot centers 15, 16 and 17 have a different relative position with respect to the intersections of the device grid lines.
Figure 4:
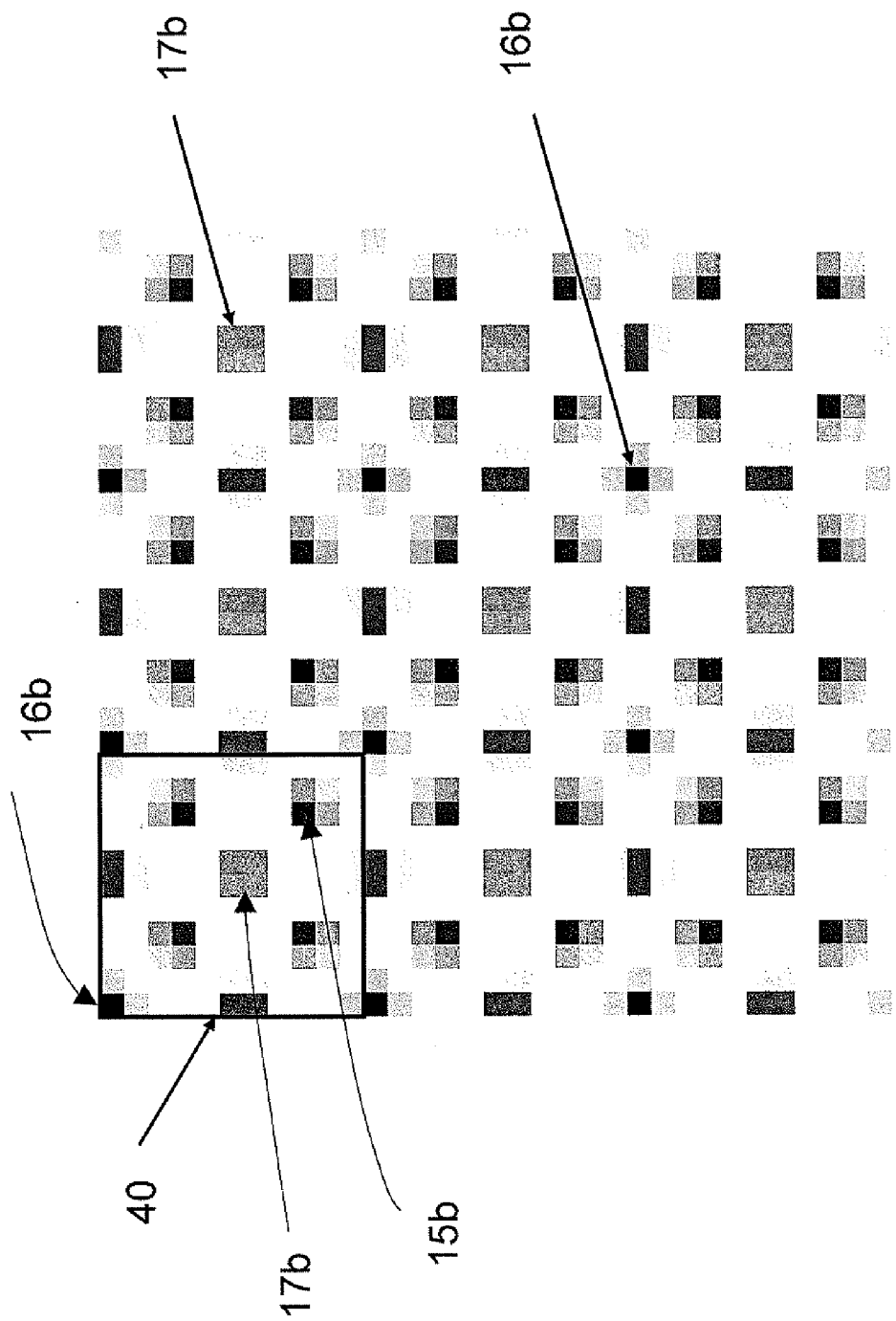
FIG. 4 shows a pattern as obtained after screening a uniform grayscale area with a grayscale value of 80% for a box filter approach of the geometry of FIG. 3 (100% being white, 0% being black). The repeating screen tile 40 is indicated in the representation of the screened image in FIG. 4. Note that clustered dot configurations 15b, 16b and 17b are quite different in terms of the occurrence of different values for the density levels of the contributing pixels.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Analysis of the Sensitivity to Amplification by Process Instability of any Remaining Level of Intrinsic Internal Moiré for a Single Separation Screen.

Figure 5:
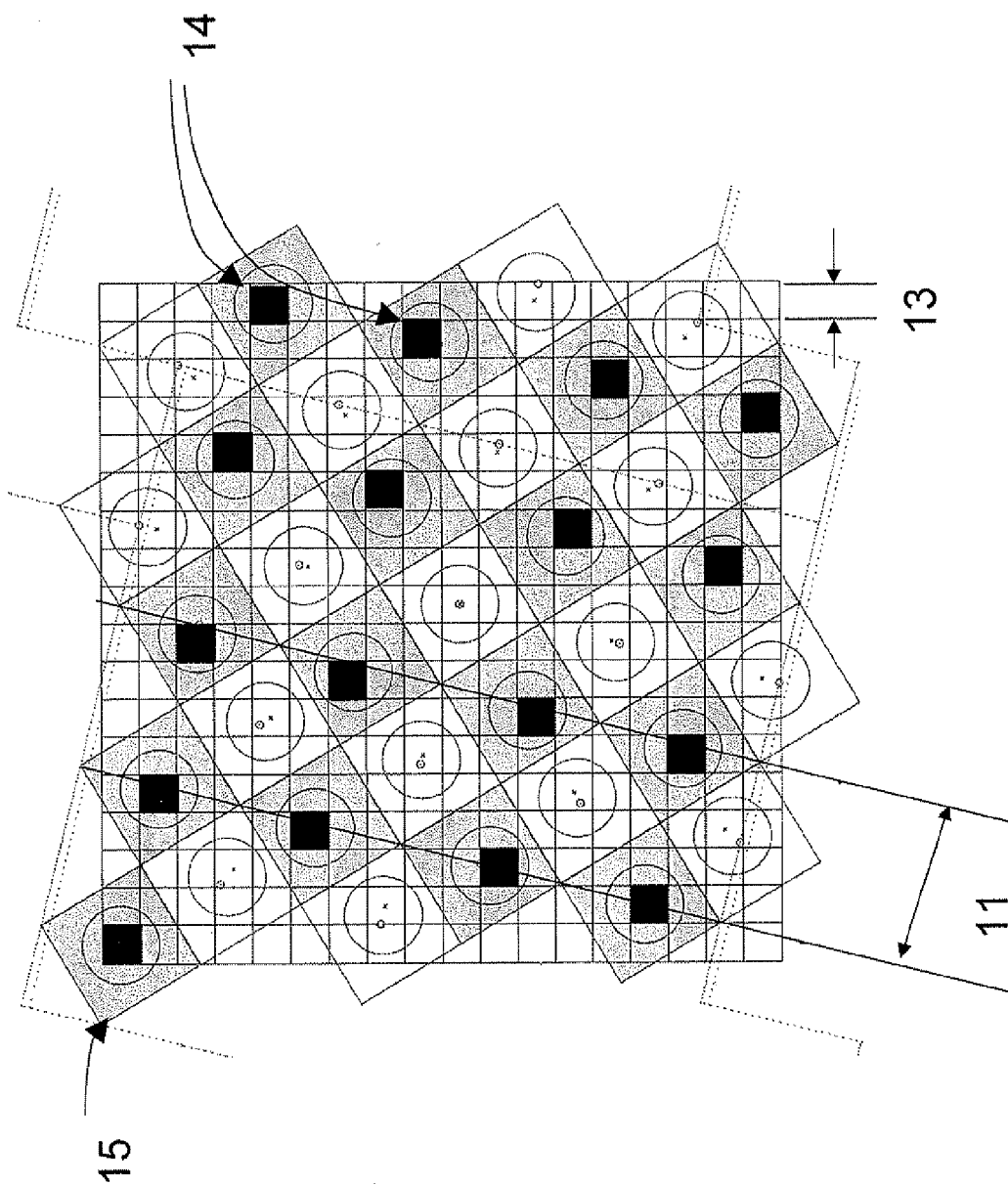
FIG. 5 shows a configuration of a pre-angled screen in a tile with TS=18, A=1, B=4. For a device resolution (13) of 600 dpi this configuration leads to a screen ruling of 137.4 lpi and a screen angle of 14.04 degrees.

FIG. 5 shows a configuration of a pre-angled screen in a tile with TS=18, A=1, B=4. For a device resolution (13) of 600 dpi this configuration leads to a screen ruling of 137.4 lpi and a screen angle of 14.04 degrees.

Figure 6:
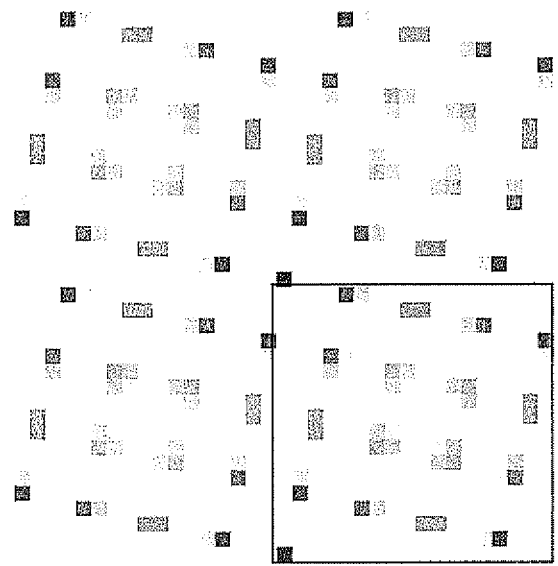
FIG. 6 shows the result for a 80% grayscale with a screening approach using the box-filter approach.

FIG. 6 shows the result for a 80% grayscale with a screening approach using the box-filter approach.

This geometry was discussed as an "intractable" case in the introduction of "Suppression of Automoire in Multilevel Supercell Halftone Screen designs" in NIP23 and Digital Fabrication 2007. pages 201-204 published in 2007 by IS&T (ISBN 0-89208-273-9).

The approach followed in this NIP23 article leads to a further smoothening of the dot profiles as compared to the box-filter approach. This approach is not suitable for electrographic systems with a non-linear development curve as the systems listed above.

An unexpected finding of the present invention is that high contrast clustered dots comprising one or more device pixels with the maximum density level have superior stability with respect to development artifacts and process instabilities compared to clustered dots composed of device pixels with intermediate density values. Accordingly the present invention provides screen generation algorithms that maximize the contrast in the screen as opposed to the "smoothening" approach suggested in "Suppression of Automoire in Multilevel Supercell Halftone Screen designs" in NIP23 and Digital Fabrication 2007. pages 201-204.

Figure 7:
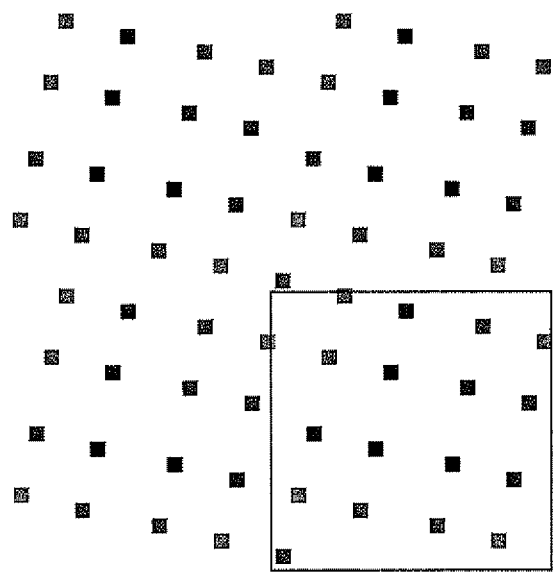
FIGS. 7 to 9, show an embodiment according to a preferred method of screening for a single separation screen.
Figure 9:
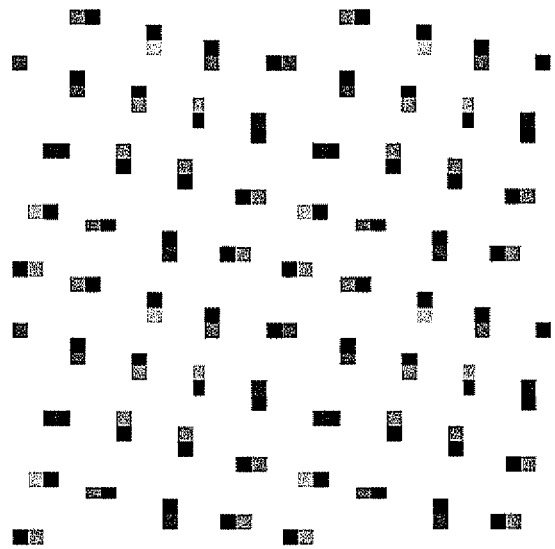
Figure 8:
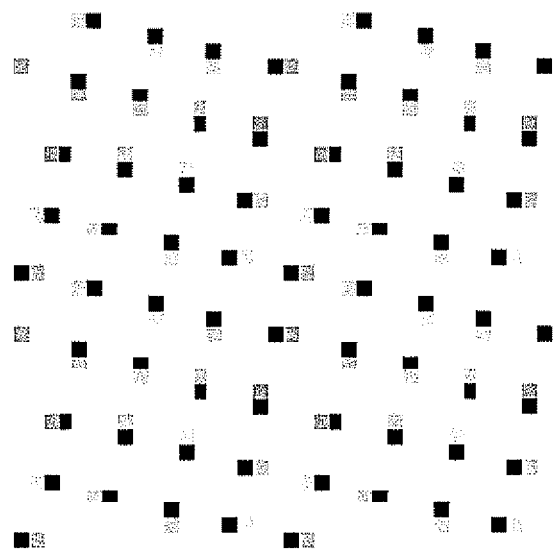

An embodiment according to a preferred method of screening for a single separation screen is shown in FIGS. 7, 8 and 9.

As indicated in FIG. 5 the device pixel which is closest to the target dot center for the dot cluster (14) is selected first and its density is increased in subsequent steps across the full range of more than 2 available density levels. The different clustered dots are incremented in an appropriate order such that areas where the device pixels (14)—which are closest to the target dot center for the dot cluster—are further apart receive their increments first.

The present invention provides an implementation for this increment order based on evaluation of the density contributions from the pixels integrated over a finite neighborhood of the candidate cluster dot to be incremented.

The resulting configurations after screening as shown in FIGS. 7, 8 and 9 have the attractive characteristic of high contrast. It has been found that these screen patterns are quite stable with respect to development related artifacts and it was also found that there is no or very little amplification of internal moiré by process instabilities.

Image Noise Analysis for Characterization of Visible Patterning and Image Grain.

Image noise and visible patterning correspond to an unwanted signal that is superimposed upon a desired signal. Noise may be random and may be caused by uncontrolled fluctuations in the process, e.g. in the printing process. Visible patterning due to screening equally contributes to the "unwanted signal"

Noise and visible patterning in a printed image may be determined by measuring a "perceived" standard deviation of a substantially constant density, as described in EP-A-768 577. This method is called "perceived noise metric" and the determined noise values are called the "perceived visual noise values". Other methods to determine noise are conceivable, e.g. the method described by R. Ulichney in "Digital Halftoning", Cambridge Mass., MIT Press, 1987.

Figure 20:
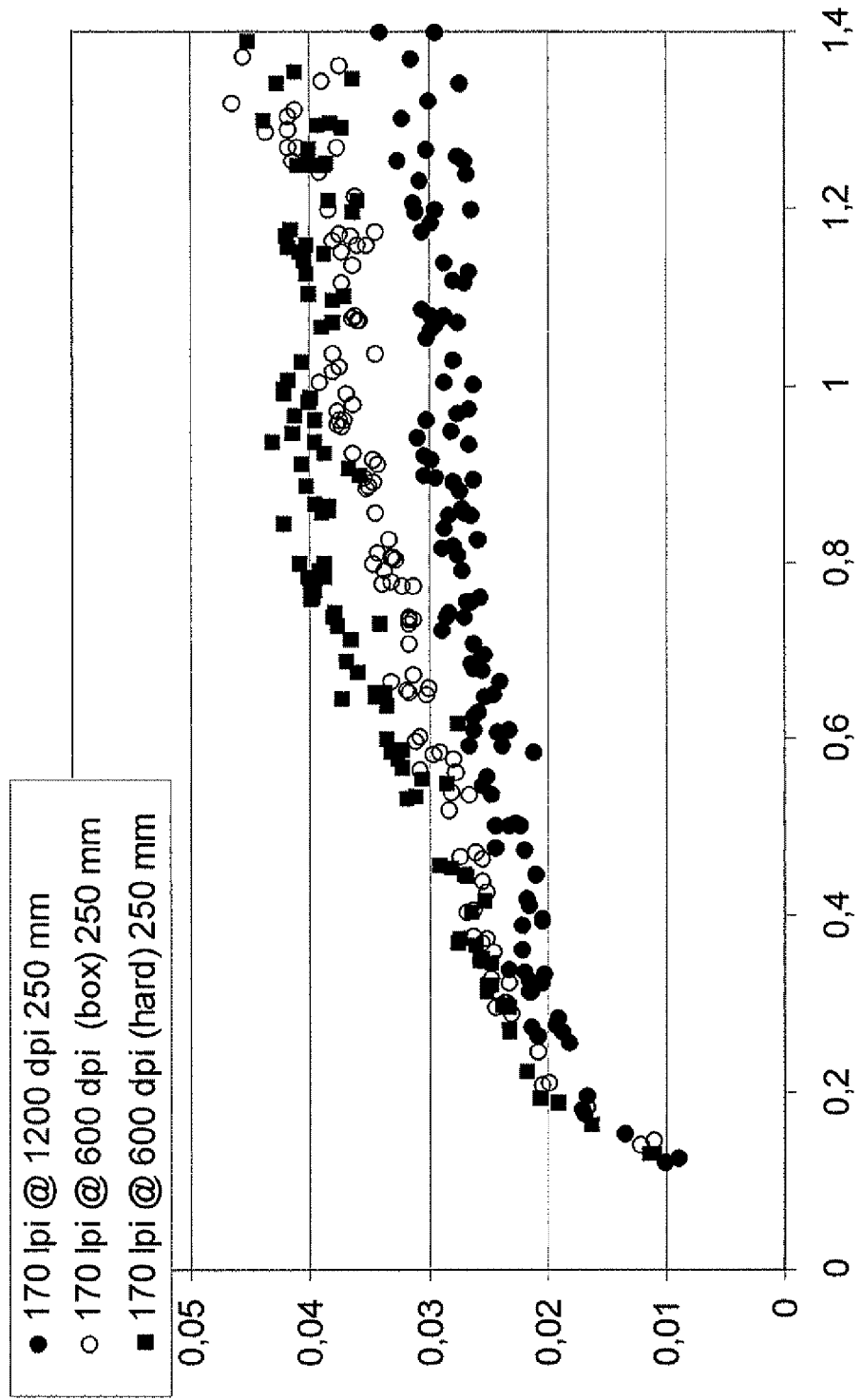
FIGS. 20, 21 and 22, illustrate a method according to an embodiment of the present invention applied to a number of print configurations as indicated by the legend of the used symbols.
Figure 21:
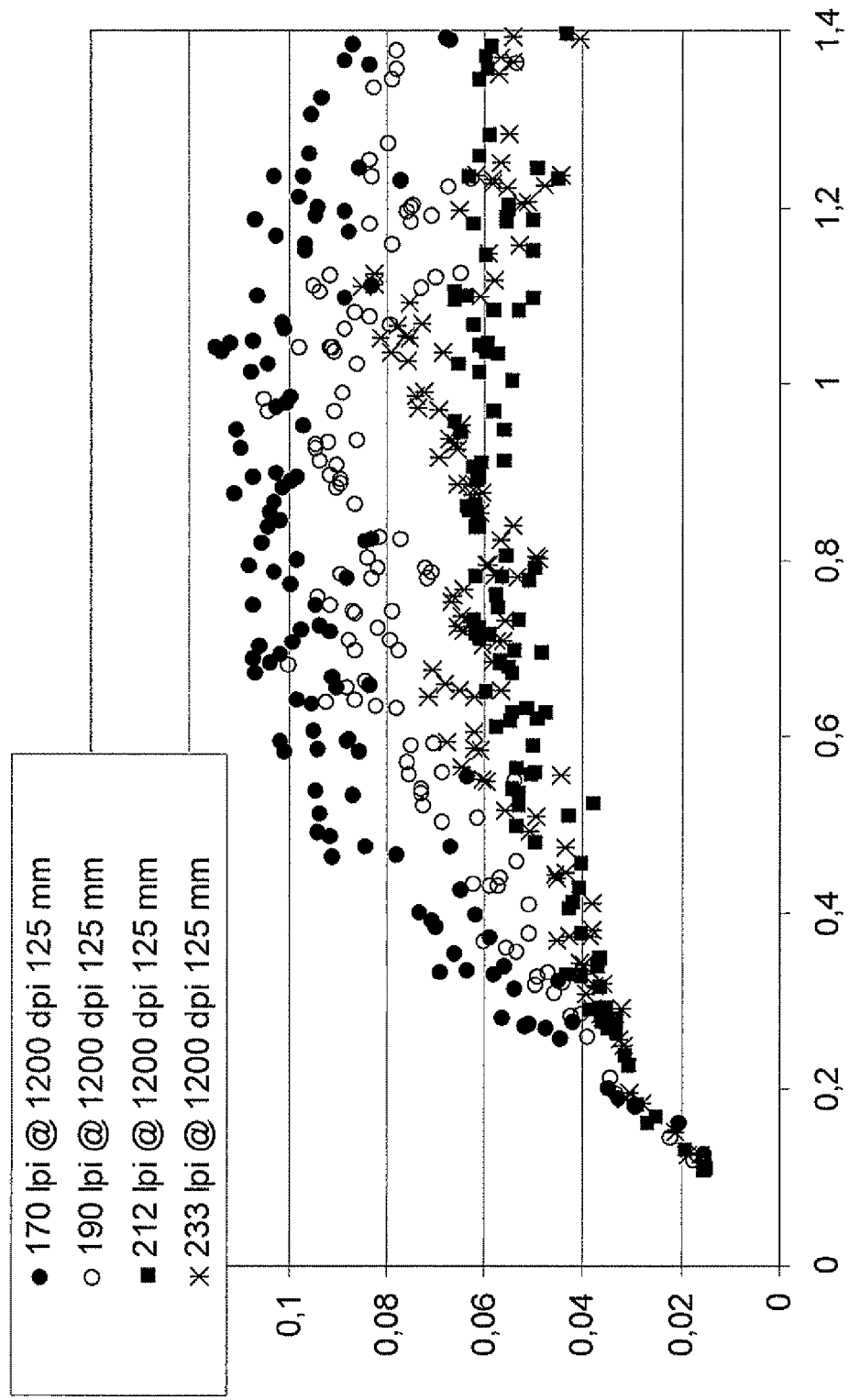
Figure 22:
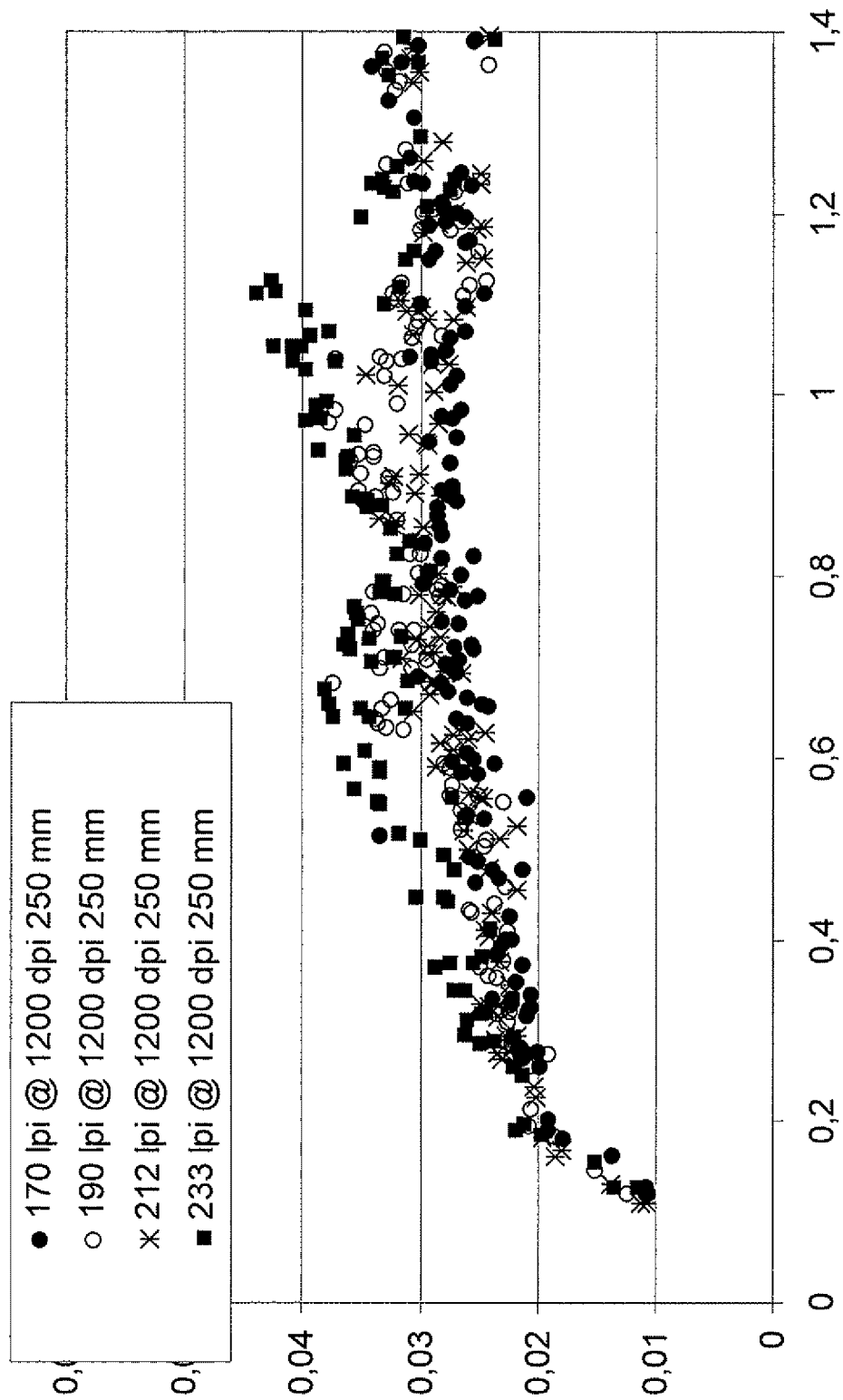

The "perceived noise metric" can be summarized as follows:

2 dimensional microdensitometry or high resolution scanning of the image sample;
visual transfer function (=frequency filter);
transformation to perceived densities;
calculation of mean value "x" and standard deviation "$\sigma$";
the perceived visual noise value at level "x"=the standard deviation "$\sigma$";

In the examples of FIGS. 20, 21 and 22, this method was applied to a number of print configurations as indicated by the legend of the used symbols.

For each print configuration, 255 patches corresponding to the monochrome printing input values for printing with black toner only having a substantially constant density were printed. The printing was done on paper and the density patches were measured in reflection mode using a scanner at a resolution of 2400 dpi. The present invention is not limited to paper but includes all forms of markable media such as paper, cardboard, plastic sheets etc. The method corresponds to the method described in EP1014207 but uses a calibrated CCD based scanner rather than microdensitometry as described in EP1014207

The obtained scan of the reflectance was converted to a "perceived" image by means of a perception model. This conversion comprises the following steps:
(i) applying visual filtering, describing the spatial frequency characteristics of the "early" eye, i.e. only taking in account the receiving characteristics of the eye. The used filter was the one as described in detail by J. Sullivan et al. in IEEE Transactions on Systems, Man and Cybernetics, vol. 21, no 1 p. 33 to 38, 1991. The viewing distance was 125 mm in FIG. 16 and 250 mm in FIGS. 20 and 22.
(ii) transforming the reflectance (R), that have been transformed in step (i) by the filtering, to visual densities (Dvis), by following formulae:

$Dvis = 2.55 \times (1 - R1/3)$ when the reflectance (R) is higher than or equal to 0.01, and $Dvis = 2.00$ when the reflectance (R) is lower than 0.01, while the eye can differentiate reflectances below 0.01.

In the thus obtained "perceived" image the standard deviation of the density fluctuation (σD) was calculated. This standard deviation is the "perceived visual noise value".

In FIGS. 20, 21, 22 the density values of the respective patches measured have also been converted to "visual Densities" according to the formula (ii)

Avoiding Visible Patterning Related to "Internal Moiré" for the Printing of the Separation Screen for an Ink or Toner with a High Absorbance in the Luminance Channel.

The high contrast images obtained after the "preferred" screening method as shown in FIG. 7 are found to be very robust with respect to toner development related artifacts. These screening methods can be described as "hard" as they typically give high contrast.

The position deviation of the high contrast dots from the idealized clustered dot positions typically can give rise however to an observable level of "patterning". Especially for separation screens that are to be printed with a toner than has a high absorbance in the luminance channel, any remaining tendency to this type of patterning can be picked up more easily by the observer. The toner with the highest absorbance in the luminance channel is black, followed by the primary colors, e.g. Magenta and Cyan. Other toners can be used such as spotcolors of Red, Green Blue etc. Some of these spotcolor toners also have quite high absorbance in the luminance channel.

It was found that screen methods as used for FIGS. 7, 8 and 9 can be used for Cyan and Magenta, but that they are less preferable for Black.

Figure 13:
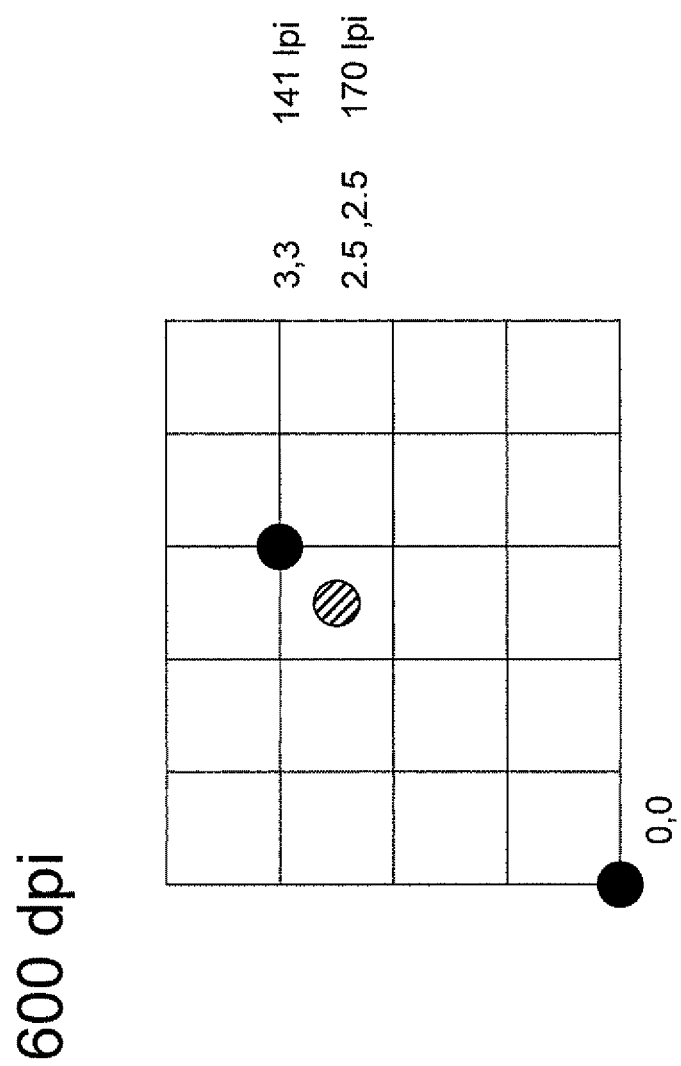
FIG. 13 shows how cluster dot centers can be chosen to generate a 141 lpi black screen with a screen angle of 45 degrees on a printing device with 600 dpi addressability. With a first dot cluster at location (0,0) a position for a nearest identical cluster dot is at (3,3), (3, –3), (–3,3) and (–3,–3) in that case.

High contrast screens that do not require position deviations can be generated for screen rulings that can be implemented as simple rational screens. For the black screen, the preferred conventional screen angle is 45 degrees. FIG. 13 shows how cluster dot centers can be chosen to generate a 141 lpi black screen with a screen angle of 45 degrees on a printing device with 600 dpi addressability. With a first dot cluster at location (0,0) a position for a nearest identical cluster dot is at (3,3), (3, −3), (−3,3) and (−3,−3) in that case. Note that all dot cluster centers have an identical relative position with respect to the device grid of addressable pixel positions.

For a 170 lpi screen with a screen angle of 45 degrees on a printing device with 600 dpi addressability and a given first dot cluster at location (0,0) the positions for the nearest cluster dots is are (2.5,2.5), (2.5, −2.5), (−2.5,2.5) and (−2.5,−2.5) as indicated in FIG. 13. Not all dot cluster centers have an identical relative position with respect to the device grid of addressable pixel positions. Half of the dot cluster centers are shifted over (0.5,0.5).

Figure 15:
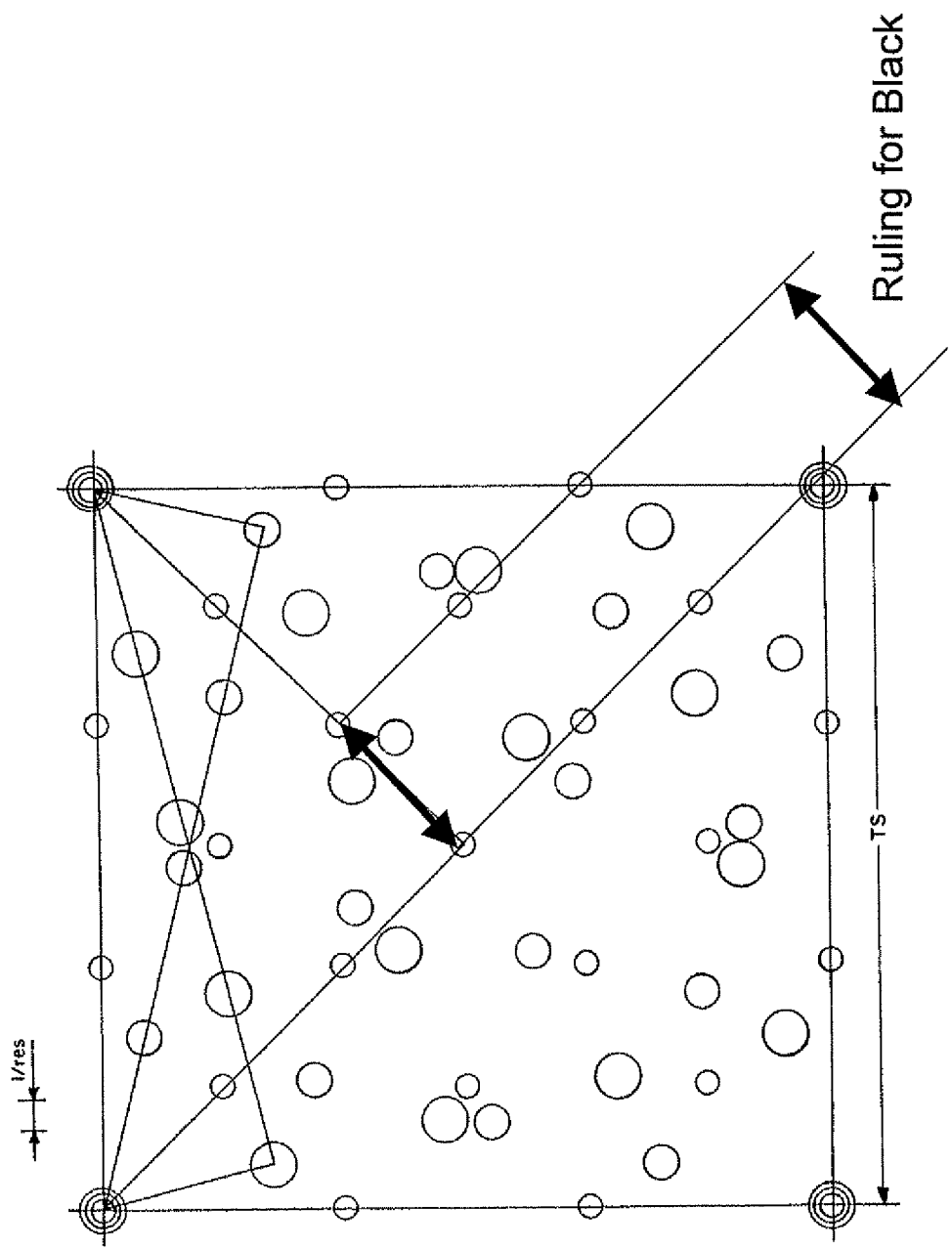
FIG. 15 illustrates how to derive a new enlarged supercell derived from the smaller supercell from the 3 screens geometry.

As mentioned before, the Xeikon DCP printing system family including the more recent Xeikon 6000 system have been providing a 170 lpi on a 600 dpi device with the black screen under 45 degrees. In FIG. 15 an image noise analysis for characterization of visible patterning and image grain is given for this 170 lpi screen.

As indicated the box filter approach indicated with (box) in the legend is sensitive to an intrinsic internal moiré effect that is amplified by process instability with a resulting frequency at 120 lpi. A high contrast version has definitely advantages as it is less sensitive to toner development artifacts, but as shown in FIG. 15, at small viewing distances the dot distortion pattern at 120 lpi can be perceived.

It is concluded from these experiments that the amplitude of the dot distortions must be controlled. Significant dot distortion is generally perceived by the observer at smaller viewing distances for separation screen that are to be printed with toners that have a high absorbance in the luminance channel.

The Benefits of Using a Higher Spatial Resolution Imaging System Such as 1200 dpi for Digital Printing A new LED based printhead for high quality imaging in electrophotographic printing systems was recently discussed in IS&T's NIP21: International Conference on Digital Printing Technologies, Baltimore, Md.; Sep. 18, 2005; p. 667-670; ISBN/ISSN: 0-89208-257-7. This system has optics and illumination spot fully matched to the 1200 dpi resolution. The combined higher resolution and addressability allows a much finer rendition of the geometric clustered dot screen definition.

Figure 12:
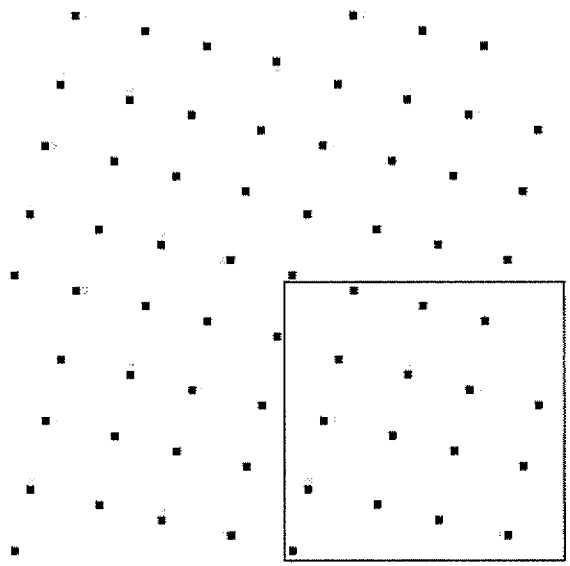
FIGS. 11 and 12 show screened images revealing the dot configuration for highlight patches.
Figure 11:
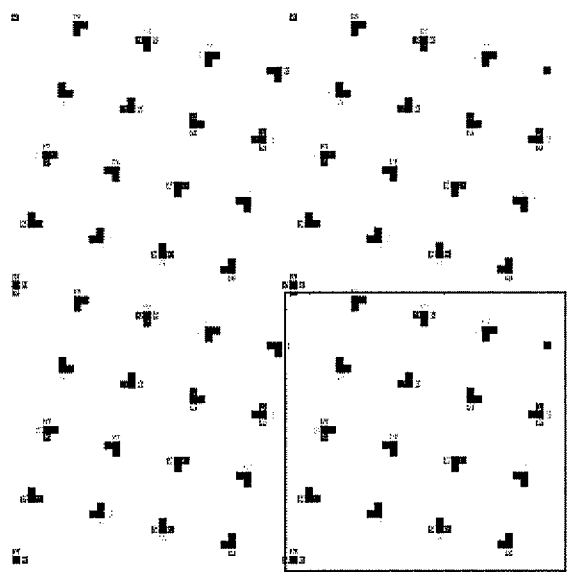

FIG. 10 shows a configuration of a pre angled screen in a tile with TS=36, A=1, B=4. For a device resolution (13) of 1200 dpi this configuration leads to a screen ruling of 137.4 lpi and a screen angle of 14.04 degrees. FIG. 10 therefore shows the equivalent screen at 1200 dpi of the 600 dpi screen in FIG. 5. Note that the amplitude of the position deviation that is required to generate the screen patterns consisting of high contrast dots is significantly smaller in FIG. 10 than it was in FIG. 5. Screened images revealing the dot configuration for highlight patches are shown in FIGS. 11 and 12.

Figure 14:
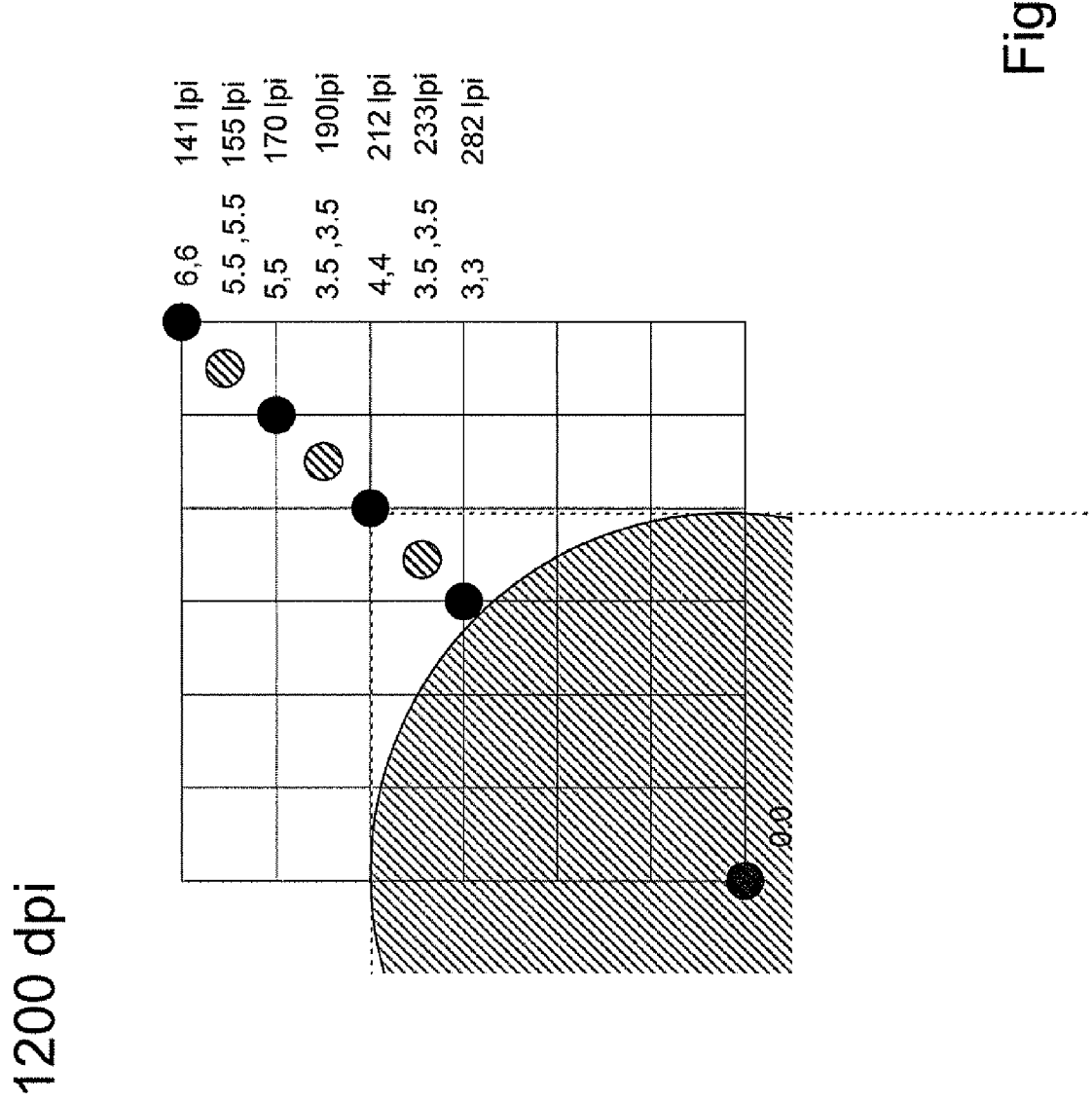
FIG. 14 shows target cluster dot center locations for a variety of screens rulings for the angle of 45 degrees that is typically used for the black screen. Solid circles correspond to "simple rational" screens in which all the target positions for the centers of clustered dots for that separation screen have an identical relative position with respect to the device grid of addressable pixel positions.

In analogy with FIG. 13, FIG. 14 shows target cluster dot center locations for a variety of screens rulings for the angle of 45 degrees that is typically used for the black screen. Solid circles correspond to "simple rational" screens in which all the target positions for the centers of clustered dots for that separation screen have an identical relative position with respect to the device grid of addressable pixel positions.

The 170 lpi screen using the 1200 dpi imaging head is shown in comparison with the "box" and the "hard" 600 dpi screens in the analysis of visible patterning and image noise in FIG. 20 for a Xeikon 6000 toner based electrophotographic engine (manufactured by Punch Graphix, Lier, Belgium). With the screen angle at 45 degrees similar screens in which all the target positions for the centers of clustered dots for that separation screen have an identical relative position with respect to the device grid of addressable pixel positions can be generated for screen rulings at 282 lpi, 212 lpi, 141 lpi, 116 lpi, 106 lpi, 85 lpi and a variety of screen with even lower screen ruling.

Examples of screens with a screen angle of 45 degrees for which not all dot cluster centra have an identical relative position with respect to the device grid of addressable pixel positions are indicated by the shaded circles in FIG. 14. For these screens half of the dot cluster centra are shifted over (0.5,0.5).

FIG. 21 shows an analysis of visible patterning and image noise for a variety of "hard" screens with a screen angle of 45 degrees with screen rulings at 170 lpi, 190 lpi, 212 lpi and 233 lpi on a Xeikon 6000 toner based electrophotographic engine equipped with 1200 dpi. In FIG. 21 the viewing distance was selected to be extremely small in order to emphasize the effect that at small viewing distances the screen itself can be perceived. At small but "realistic" viewing distances of 250 mm, the basic screen frequency is not perceivable. FIG. 22 shows the analysis of visible patterning and image noise for a viewing distance of 250 mm for the same printouts as in FIG. 21. The 170 lpi and 212 lpi screens—for which all the target positions for the centers of clustered dots for that separation screen have an identical relative position with respect to the device grid—have the lowest image noise. Due to the contribution of "process" noise of the printing process for that particular test the 170 lpi and 212 lpi screen have a similar amount of image noise.

The 190 lpi and 233 lpi screens for which half of the dot cluster centers are shifted over (0.5,0.5) introduce a lower frequency component due to the patterning as a consequence of the position modulation of the high contrast dots. The higher noise of the 190 lpi and 233 lpi screens is predominant over the entire density range. The level of the noise depends on the density of the patch to be printed. This is likely related to the effect that the non-equivalent cluster dots grow differently. The dissimilarity of the two types of cluster dots depends on the density to be printed.

For the printing systems with multiple density level capability at the pixel level of the current application, the number of density levels that the printer is capable of rendering at the pixel level is at least higher than 2 and we will represent the number of levels that can be printed besides white with an integer M. The number of density levels the printer is capable of printing at the pixel level is therefore equal to M+1.

Whereas the average number of recorder elements available for building each screen dot equals $(Res/F)^2$ for binary printing, the average number of density levels that can be rendered in the multiple densities at the pixel level case can be approximated as $M*(Res/F)^2$.

If $M*(Res/F)^2$ is less than the typically 200 levels that can be distinguished by a human observer or less than the 255 de facto industry standard, techniques are to be used that are referred to as dithering. These techniques introduce intentional differences between the cluster dots and can add to the observable patterning when M is relatively small such as when M is equal to 2 or 3.

In order to be able to provide sufficient levels after the screening without dithering for screens rulings as high as Res/6, the value of M should be around 7. For a 1200 dpi printing systems to print at screen rulings of 200 lpi and above, 3 bit (up to M=7) or 4 bit (up to M=15) per pixel encoding of the grayscale capability yield optimal results. Hence the present invention may be implemented in 2 or more or 4 or more density levels.

Derivation of the Entire Set of at Least Three Separation Screens Such that at Least One Screen is "Simple Rational"

Clustered dot screens with screen rulings in the range from 150 lpi to 250 lpi are most popular. Screens with a screen ruling lower than 150 lpi can be readily perceived by a sharp eye at normal viewing distances. Even in the most optimal viewing conditions screens at 250 lpi can not be perceived, Although 141 lpi is strictly outside the optimal range, we used it as a first example of a preferred approach for our inventive screening method. Screens in the range of 150 lpi and 250 lpi are even more preferred, as 141 lpi screens are perceivable by a sharp eye.

Combining e.g. the 141 lpi screen with the "hard" screen as shown in FIGS. 10, 11 and 12 with a screen ruling of 137.4 lpi and a screen angle of 14.04 degrees for a second separation screen and the symmetric screen (A=4, B=1, TS 36, 1200 dpi) with a screen ruling of 137.4 lpi and a screen angle of 75.94 degrees for a third separation screen leads to a first embodiment of the current invention. In accordance with this embodiment of the present invention a screening system for printed reproduction of images on a digital printing system is provided capable of rendering more than 2 density levels, e.g. capable of rendering more than 4 density levels, at the device pixel level using precalculated rectangular screening tiles that define a spatially repetitive screening operation according to geometric clustered dot screen definitions for first, second and third separation screens, said first, second and third separation screens having different screen angles and each having rulings with at least two of the screen rulings being different by a finite amount and with at least one vector sum of two frequency components of one pair of screens being equal to at least one frequency component of the other screen or to a multiple or submultiple of said at least one frequency component of the other screen, in which at least one of said three separation screens is simple rational, meaning that all the target positions for the centers of clustered dots for that separation screen have an identical relative position with respect to the device grid of addressable pixel positions, wherein the angular relation between said three screens is equivalent by (an optional) rotation of the entire screening system to the angular relation of a system of three screens with screen angles at 15 degrees+delta1, 45 degrees+delta2, 75 degrees+delta3, with delta1, delta2, delta3 when expressed in degrees satisfying the relations

|delta 1|<1 degree,

|delta 2|<1 degree,

|delta 3|<1 degree, e.g.

|delta 1|<0.3 degree,

|delta 2|<0.3 degree,

|delta 3|<0.3 degree,

In view of the preference for at least one separation screen to be used with an ink or toner with a high absorbance in the luminance channel for which all the target positions for the centers of clustered dots for that separation screen have an identical relative position with respect to the device grid of addressable pixel positions, there is especial interest in such screens with a screen ruling in the range between 150 lpi and 250 lpi.

For the conventional choice where the screen separation for the black toner is chosen with a screen angle of 45 degrees, there are only 2 screens satisfying this criterion in the range between 150 lpi and 250 lpi and that are the 212 lpi and the 170 lpi screen.

These 212 lpi, 170 lpi screens are preferred screens for the screen separation for use with a toner with a high absorbance in the luminance channel. Screens for the two other screen separations of the at least three screen separations can be defined is terms of their geometry in view of the concept of U.S. Pat. No. 5,155,599.

By studying the concept of U.S. Pat. No. 5,155,599 in detail, a method for deriving rational approximants that can approach the ideal screen angles to arbitrary precision in a closed set based on a single supercell tile of finite size.

The approach is based on listing the values A,B end TS of the concept of FIG. 1 in a table where A=1 and B=4.

Starting from the configuration of FIG. 1. improved approximants can be derived by applying the recursion rule as shown in table 1.

Similar recursion tables can be made using as initial A=1, B=3 or A=2, B=7 or A=1, B=5.

FIG. 15 was slightly adapted from U.S. Pat. No. 5,155,599 and shows how a closed set of three screen separations is built within a rectangular supertile with Tilesize TS.

Given the line ruling and screen angle for the first screen being fixed in view of the relation with the device grid, the Tilesize is now derived as indicated in FIG. 15.

A table that allows to select second and third screen separations according to the present invention based on the first screen separation for which all the target positions for the centers of clustered dots for that separation screen have an identical relative position with respect to the device grid of addressable pixel positions is shown for the specific example of the 170 lpi at 1200 dpi screen in Table 2.

The scheme was implemented in a worksheet application—such as Microsoft Excell—and the only required input are the coordinates of the target position of the nearest dot cluster (k_x, k_y) expressed in the device resolution assuming a first dot cluster center at (0,0).

Optional Rotation of the Entire Screenset

For the conventional choice where the screen separation for the black toner is chosen with a screen angle of 45 degrees, there are only 2 screens satisfying this criterion in the range between 150 lpi and 250 lpi and that are the 212 lpi and the 170 lpi screen.

There is interest in screens of lower ruling such as 150 lpi because such lower resolutions screens typically are less sensitive to toner development artifacts of the printing process. On the other hand, there is also interest in screens with rulings around 250 lpi for ultimate "photo-look" quality, and there may be interest for screens in between 170 lpi and 212 lpi.

Figure 17:
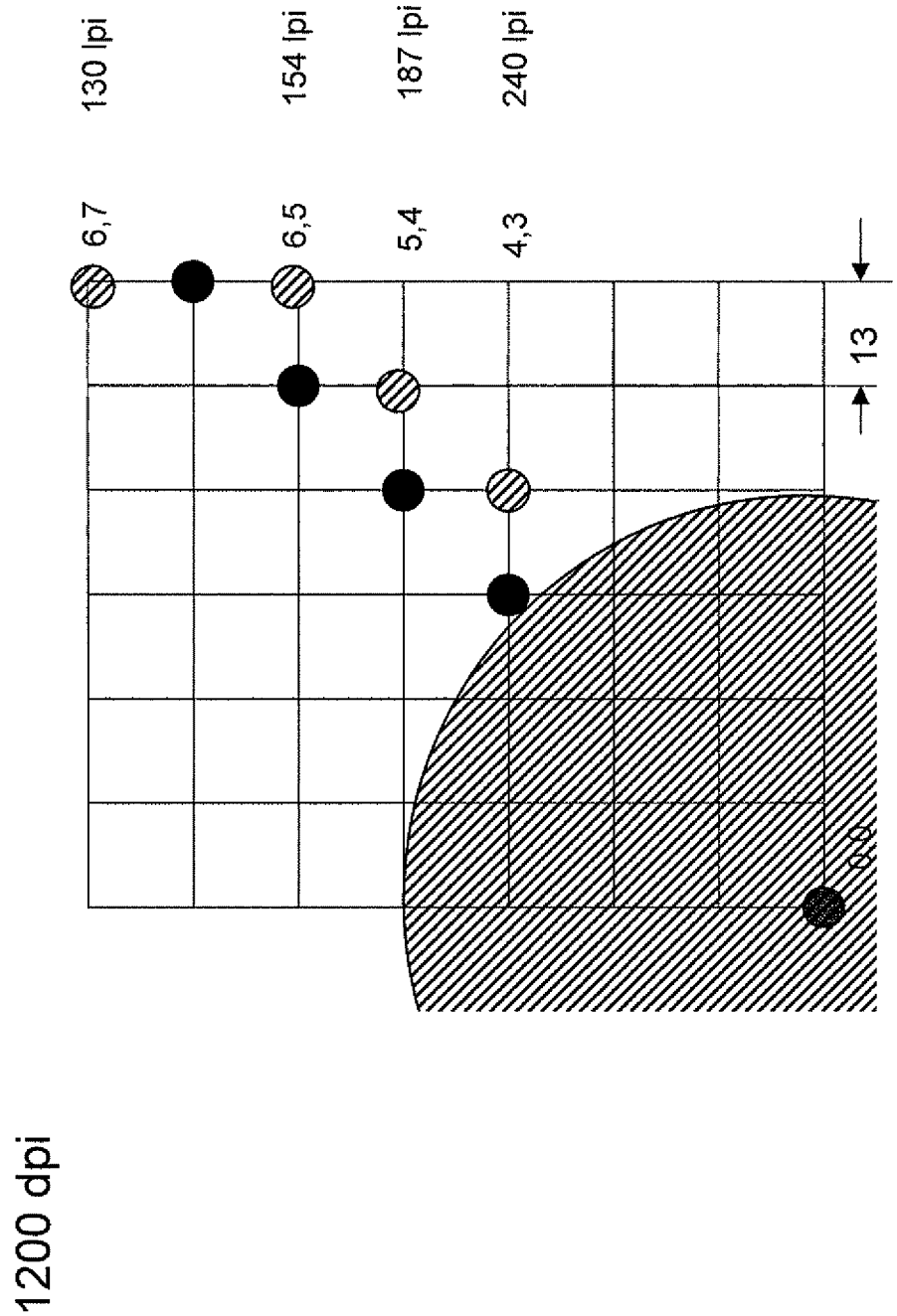
FIG. 17 illustrates that first clustered dot screens with the desired property that the target positions for the centers of clustered dots for that separation screen have an identical relative position with respect to the device grid of addressable pixel positions can be generated as a rotated square pattern with an angle differing from 45 degrees.

While experimenting with rotated screens, we realized by coincidence that first clustered dot screens with the desired property that the target positions for the centers of clustered dots for that separation screen have an identical relative position with respect to the device grid of addressable pixel positions can be generated as a rotated square pattern with an angle differing from 45 degrees as indicated with the gray circles in FIG. 17.

Figure 16:
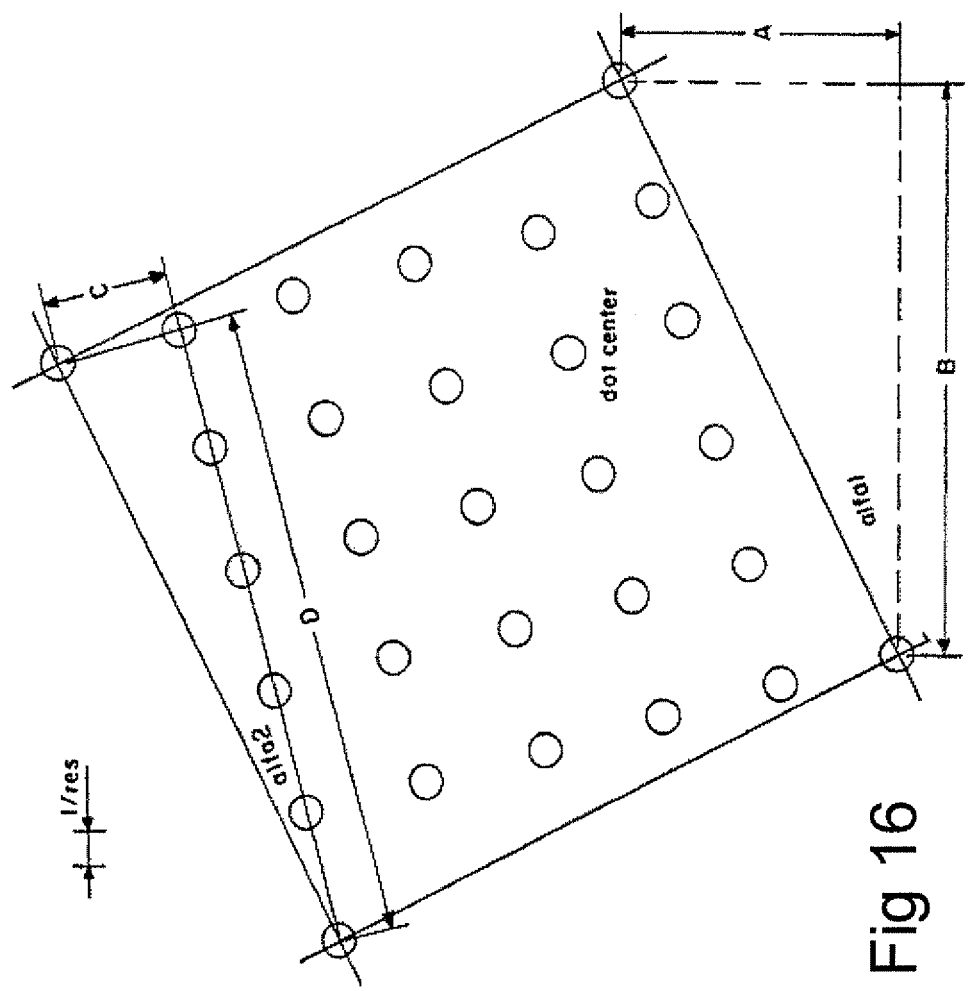
FIG. 16 indicates the parameters A,B and C,D that are used in the generalized worksheet tables 2, 3, and 4.
Figure 18:
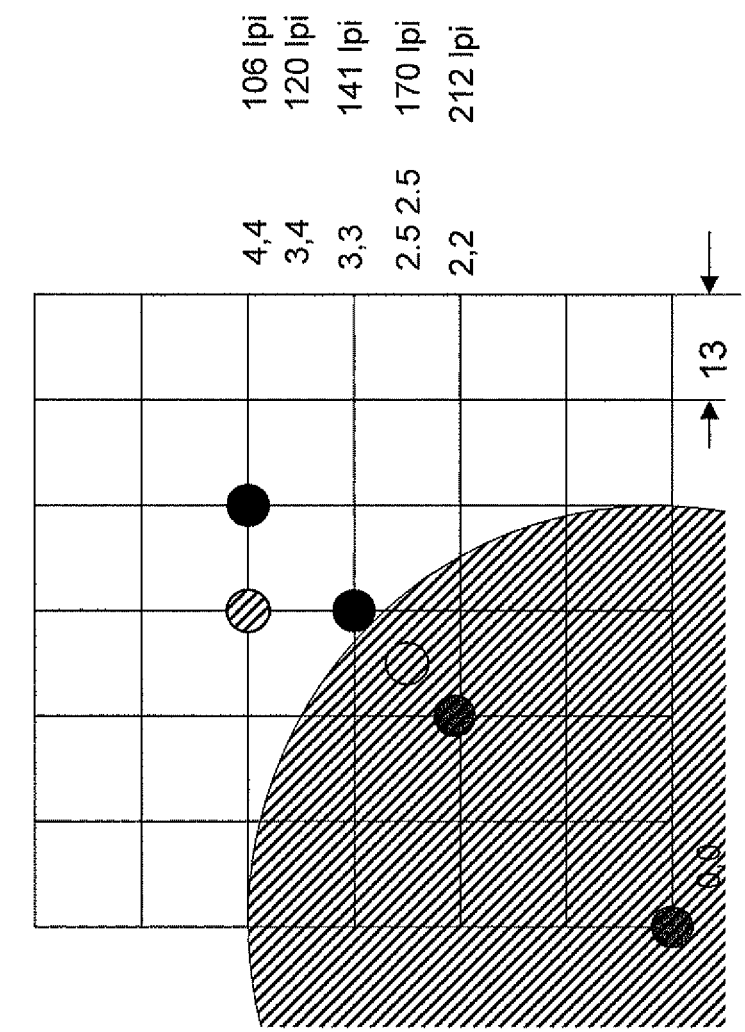
FIG. 18 shows examples like that of FIG. 17 but for a 600 dpi system.

Whereas FIG. 17 shows examples for a 1200 dpi system, FIG. 18 shows the same concept for a 600 dpi system Generalizing the—worksheet application—to start form couples (k_x, k_y) with k_x not equal to K_Y requires a rotation of the entire screenset. FIG. 16 indicates the parameters A,B and C,D that are used in the generalized worksheet tables 2, 3, and 4.

The finite tiles of the rotated square can be represented as a UTAH type tile and this format allows converted to a brick wall format for implementation in the screening hardware. Memory limitations in the screening hardware may limit the tilesize to several 10000 elements, while some line based memory arrangements were tested that can deal with some specific tiles of several 100000 pixel elements.

Table 3 lists the options for selecting the other two of the three separation screen that give optimal results when combined with a first screen of 240 lpi at 1200 dpi. The screenset of line 8 was successfully used in "photo applications" using a prototype of the Xeikon 8000 machine made available to the public May 29 2008.

Solutions in Tables 2, 3, and 4 with angles errors larger than 1 degree or comparatives. The rosette structure lacks symmetry and is the overlay pattern reveals the repeat structure of the small repeat cell.

Figure 19:
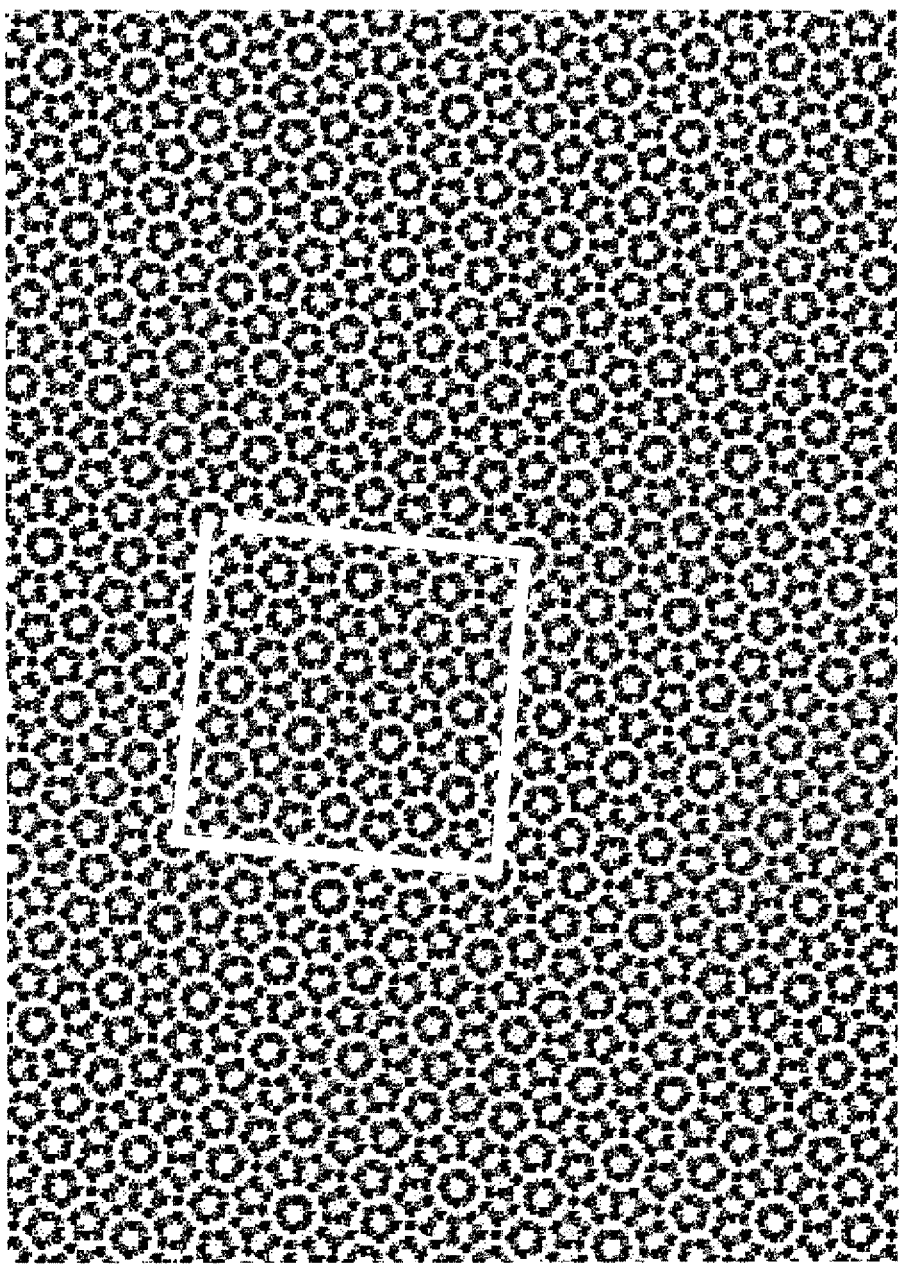
FIG. 19 shows a monochrome representation (for reproduction purposes) of an overprint pattern of the three separation screen as in line 8 from table 4.

Even more pleasing rosette patterns are obtained when the angle errors are less than 0.3 degrees. FIG. 19 shows a typical preferred rosette configuration where the angle error is smaller than 0.1 degrees. The 410 by 410 tile size of line 12 of table 2 gives even more preferred results with angle errors of the order of 0.005 degrees.

Table 4 lists the options for selecting the other two of the three separation screens that give optimal results when combined with a first screen of 187 lpi at 1200 dpi.

FIG. 19 shows a monochrome representation (for reproduction purposes) of an overprint pattern of the three separation screen as in line 8 from table 4. The screenset is rotated by 6.13 degrees and correspond to a screen with approximate screen ruling of 187 lpi at 1200 dpi resolution.

Although the examples refer to black as the type of ink or toner for the ink or toner with a high absorbance in the luminance channel, other toners or inks can be selected for use with the first separation screen for which the target positions for the centers of clustered dots for that separation screen have an identical relative position with respect to the device grid of addressable pixel positions.

After extensive experimentation it has been found that the relation of the device resolution and the screen ruling determines the sensitivity of to patterning of the "hard" screens with dot position modulation.

Visible patterning was found to compromise the use of "hard screens" when the screen ruling is higher than the Res/4. The require dot center deviations become too large in comparison to the cluster dot spacing when the screen ruling is higher than Res/4.

Reasonably good results are obtained with the current approach when the screen ruling is lower than Res/4 while the optimal results can be obtained for screen rulings equal than or lower than Res/5.

The region of excessively high screen rulings for the device resolution considered where the proposed method of hard screens generates relatively poor results is indicated by the shaded circle in FIG. 14 for the 1200 dpi case. Within this circle, the amplitude of the position distortion is so large that neighboring dots start to influence each other and this gives rise to an increased tendency of visible patterning. Within the shaded circle high values of M are needed to get sufficient levels after screening without dithering.

Accordingly, the screening system according to the present invention may have screen rulings of each of said three separation screens that satisfy the constraint device resolution/8<screen ruling<device resolution/4.

Higher Number of Separations

For print systems allowing the use of more than three separations for use in combination with a fourth toner or ink as in CMYK printing, or for use in systems with five separations as in the Xeikon and Nexpress digital color presses that are equipped with five printing stations or for use in printing systems with more than five printing stations, e.g. 8 printing stations, different approaches can be used for a screening method using precalculated rectangular screening tiles of finite size for such optional fourth, fifth, sixth or higher separation in addition to three screen definitions with the preferred properties as described above.

The additional screening method for an additional colorant or ink can re-use the geometry of one of the at least three screens that are already in use. An additional green separation can for example re-use the geometry of a screen that is used for a magenta screen. Such an approach makes especially sense in accordance with an embodiment of the present invention when the color separation strategy is a method that avoids the simultaneous use of any significant amount of green and magenta in any area of the images to be separated, or uses this strategy only in areas of the image where there is little simultaneous use of any significant amount of green and magenta.

In an alternative embodiment a screening approach is used having precalculated rectangular screening tiles of finite size that is not based on a repetitive square grid clustered dot structure, such as screen systems based on generalizations of green noise masks (Modern Digital Halftoning—D. Lau and R Arce-Marcel Dekker Inc. New York—Basel ISBN 0-8247-0456-8) or multilevel implementations of such screens lacking a regular square grid dot structure such as Kodak Nexpress Stacato DX screening as described in "Advances in Technology of KODAK NEXPRESS Digital Production Presses" in NIP23 and Digital Fabrication 2007, pages 489-493 published in 2007 by IS&T (ISBN 0-89208-273-9).

Use of such non-square clustered dot screens for the yellow screen is a preferred option in accordance with an embodiment of the present invention to complement a set of more than three separations where at least three of the screen separations are according to claim 1.

Four color printing with Cyan Magenta, Yellow and Black is a good example where as further a non-limiting example of an embodiment of the present invention, the screens for cyan, magenta and Black are according to claim 1 while the yellow screen can be based on such screening approach that is not based on a repetitive square grid clustered dot structure.

Another preferred embodiment for the screening geometry for a fourth screen in four or more colour printing is based on an additional clustered dot screen that complements the (optionally rotated) screenset where three screens take the traditional angular relationship of 15 degrees, 45 degrees and 75 degrees with a fourth screen under a angle of 0 degrees.

Preferentially, this fourth screen is also a rectangular dot screen or a square dot screen. A square dot screen at 0 degrees for complementing a set of three screens at 15 degrees, 45 degrees and 75 degrees works very well when a screen frequency is used that is different from the screen frequency of the screen of 45 degrees by X % with 3<X<50.

Accordingly, the present invention provides a screening system for printed reproduction of images on a digital printing system capable of rendering more than 2 density levels at the device pixel level using precalculated rectangular screening tiles that define a spatially repetitive screening operation according to geometric clustered dot screen definitions for first, second, third and fourth separation screens, said first, second, third and fourth separation screens having
different screen angles and each having first, second third and fourth rulings (ruling1, ruling2, ruling3 and ruling4) with at least two of the screen rulings being different by a finite amount and with at least one vector sum of two frequency components of one pair of screens being equal to at least one frequency component of the other screen or to a multiple or submultiple of said at least one frequency component of the other screen,
in which at least one of said four separation screens is simple rational, meaning that all the target positions for the centers of clustered dots for that separation screen have an identical relative position with respect to the device grid of addressable pixel positions, wherein the angular relation between said four screens is equivalent by (an optional) rotation of the entire screening system to the angular relation of a system of three screens with screen angles at 15 degrees+delta1, 45 degrees+delta2, 75 degrees+delta3, 0 degrees+delta4 with delta1, delta2, delta3, delta4 when expressed in degrees satisfying the relations

|delta1|<1 degree, |delta2|<1 degree,

|delta3|<1 degree, |delta4|<1 degree.

From this the present invention also provides a square dot screen at 0 degrees for complementing a set of three screens at 15 degrees, 45 degrees and 75 degrees. This works very well when a screen frequency is used that is different from the screen frequency of the screen of 45 degrees by X % with 3<X<50.

Preferably the fourth ruling (Ruling4)=the second ruling (Ruling2)*X or (Ruling4)=the second ruling (Ruling2)/X with 1.03<X<1.50 and the fourth ruling (Ruling4)=the second ruling (ruling2)*M/(N*sqrt(2)) with N being an integer <10, and M being an integer <10.

The screen set comprising such four screens with screen angles at 15 degrees, 45 degrees, 75 degrees and 0 degrees can be rotated as a whole over a arbitrary angle This relation allows to derive a new enlarged supercell derived from the smaller supercell from the 3 screens geometry as in FIG. 15.

In the limit case with M=N=1, the deviation in screen ruling is 41% and the supercell that fits the interaction of the four screens has the same size as the supercell that fits the interaction of the first three screens. This approach has the benefit that the periodicities resulting from the interaction between the separations can not have a lower frequency than the initial supercell that fits the interaction of the first three screens. It is less preferred however as the interaction between the 45 degrees screen and the 0 degree screen is found to depend an a relative phase shift of these two screens as induced for example by misregistration errors resulting from fluctuations in the real life printing presses.

It is therefore more preferred that the fourth ruling (Ruling4)=the second ruling (Ruling2)*X or (Ruling4)=the second ruling (Ruling2)/X with 1.03<X<1.25 and the fourth ruling (Ruling4)=the second ruling (ruling2)*M/(N*sqrt(2)) with N being an integer >1 and <10, M being an integer >1 and <10.

An example of a non-rotated set with an fourth separation according to the features above is given in the table below and complements the three screen set geometry is given below (line 8 of table 2):
Cyan 14.93 degrees—169.35 lpi
Magenta 75.07 degrees—169.35 lpi
Yellow 0 degrees—180 lpi
Black 45 degrees—169.71 lpi
For this example X=6.51% and M=3, N=2.
An example of a rotated set with an fourth separation according to the features above is given ion the table below and complements the three screen set geometry is given below (line 8 of table 4 and FIG. 19):
Cyan 21.27 degrees—187.02 lpi
Magenta 81.41 degrees—187.02 lpi
Yellow 6.34 degrees—198.78 lpi
Black 51.34 degrees—187.41 degrees.
For this example X=6.51% and M=3, N=2
Implementation A printing system according to the present invention may have a processor programmed to implement any of the methods of the present invention. The printing system can have a screening system for printed reproduction of images, the printing system being capable of rendering more than 2 density levels at the device pixel level using precalculated rectangular screening tiles that define a spatially repetitive screening operation according to geometric clustered dot screen definitions for first, second and third separation screens, The processor is adapted, e.g. by implementing suitable software so that said first, second and third separation screens have different screen angles and each has rulings with at least two of the screen rulings being different by a finite amount and with at least one vector sum of two frequency components of one pair of screens being equal to at least one frequency component of the other screen or to a multiple or submultiple of said at least one frequency component of the other screen. The processor may also be adapted, e.g. may implement suitable software so that at least one of said three separation screens is simple rational, meaning that all the target positions for the centers of clustered dots for that separation screen have an identical relative position with respect to the device grid of addressable pixel positions.

The processor may also be adapted, e.g. may implement suitable software so that the angular relation between said three screens is equivalent by (an optional) rotation of the entire screening system to the angular relation of a system of three screens with screen angles at 15 degrees+delta1, 45 degrees+delta2, 75 degrees+delta3, with delta1, delta2, delta3 when expressed in degrees satisfying the relations

|delta 1|<1 degree,

|delta 2|<1 degree,

|delta 3|<1 degree, e.g.

|delta 1|<0.3 degree,

|delta 2|<0.3 degree,

|delta 3|<0.3 degree.

The processor may also be adapted, e.g. may implement suitable software so that the screening operation for each of said three separation screens converts an image representation for a region comprising a continuous tone value for the given separation channel into a screened image representation value for the given separation channel with the specific density value out of the available more than 2 density values for each addressable pixel position to be rendered, said screened image representation for said continuous tone value satisfying the constraint that when averaged over the pixels for that specific region more than 70% of the pixels has the minimum or the maximum density level of said more than 2 density values.

The processor may also be adapted, e.g. may implement suitable software so that the screen rulings of each of said three separation screens satisfy the constraint device resolution/8<screen ruling<device resolution/4.

The processor may also be adapted, e.g. may implement suitable software so that more than 4 density levels can be rendered.

For print systems allowing the use of more than three separations for use in combination with a fourth toner or ink as in CMYK printing, or for use in systems with five separations as in the Xeikon and Nexpress digital color presses that are equipped with five printing stations or for use in printing systems with more than five printing stations, e.g. 8 printing stations, the processor may be adapted e.g. may implement suitable software, for different approaches for a screening method using precalculated rectangular screening tiles of finite size for such optional fourth, fifth, sixth or higher separation in addition to three screen definitions with the preferred properties as described above.

The processor may be adapted e.g. may implement suitable software to provide an additional screening method for an additional colorant or ink that re-uses the geometry of one of the at least three screens that are already in use. The processor can be adapted e.g. may implement suitable software so that an additional green separation can re-use the geometry of a screen that is used for a magenta screen. Such an approach makes especially sense in accordance with an embodiment of the present invention when the color separation strategy is a method e.g. implemented in suitable software, that avoids the simultaneous use of any significant amount of green and magenta in any area of the images to be separated, or uses this strategy only in areas of the image where there is little simultaneous use of any significant amount of green and magenta.

In an alternative embodiment the processor is adapted e.g. may implement suitable software, to provide a screening approach having precalculated rectangular screening tiles of finite size that is not based on a repetitive square grid clustered dot structure, such as screen systems based on generalizations of green masks (Modern Digital Halftoning—D. Lau and R Arce—Marcel Dekker Inc. New York—Basel—ISBN 0-8247-0456-8) or multilevel implementations of such screens lacking a regular square grid dot structure such as Kodak Nexpress Stacato DX screening as described in "Advances in Technology of KODAK NEXPRESS Digital Production Presses" in NIP23 and Digital Fabrication 2007, pages 489-493 published in 2007 by IS&T (ISBN 0-89208-273-9).

The processor being adapted e.g. may implement suitable software, to use such non-square clustered dot screens for the yellow screen is a preferred option in accordance with an embodiment of the present invention to complement a set of more than three separations where at least three of the screen separations are according to claim 1.

Four color printing with Cyan Magenta, Yellow and Black is a good example where as further a non-limiting example of an embodiment of the present invention, the processor is adapted e.g. may implement suitable software, to provide the screens for cyan, magenta and Black are according to claim 1 while the yellow screen can be based on such screening approach that is not based on a repetitive square grid clustered dot structure.

In another preferred embodiment for the screening geometry for a fourth screen in four or more colour printing, the processor is adapted e.g. may implement suitable software, based on an additional clustered dot screen that complements the (optionally rotated) screenset where three screens take the traditional angular relationship of 15 degrees, 45 degrees and 75 degrees with a fourth screen under a angle of 0 degrees.

Preferentially, the processor is adapted e.g. may implement suitable software, so that this fourth screen is also a rectangular dot screen or a square dot screen. A square dot screen at 0 degrees for complementing a set of three screens at 15 degrees, 45 degrees and 75 degrees works very well when a screen frequency is used that is different from the screen frequency of the screen of 45 degrees by X % with 3<X<50.

Accordingly, the present invention provides a computer based screening system for printed reproduction of images on a digital printing system capable of rendering more than 2 density levels at the device pixel level using precalculated rectangular screening tiles that define a spatially repetitive screening operation according to geometric clustered dot screen definitions for first, second, third and fourth separation screens, whereby a processor in the computer based screening system that includes memory, is adapted e.g. may implement suitable software, so that said first, second, third and fourth separation screens having different screen angles and each having first, second third and fourth rulings (ruling1, ruling2, ruling3 and ruling4) with at least two of the screen rulings being different by a finite amount and with at least one vector sum of two frequency components of one pair of screens being equal to at least one frequency component of the other screen or to a multiple or submultiple of said at least one frequency component of the other screen, in which at least one of said four separation screens is simple rational, meaning that all the target positions for the centers of clustered dots for that separation screen have an identical relative position with respect to the device grid of addressable pixel positions, wherein the angular relation between said four screens is equivalent by (an optional) rotation of the entire screening system to the angular relation of a system of three screens with screen angles at 15 degrees+delta1, 45 degrees+delta2, 75 degrees+delta3, 0 degrees+delta4 with delta1, delta2, delta3, delta4 when expressed in degrees satisfying the relations

|delta1|<1 degree, |delta2|<1 degree,

|delta3|<1 degree, |delta4|<1 degree.

From this, the processor according to the present invention may provide a square dot screen at 0 degrees for complementing a set of three screens at 15 degrees, 45 degrees and 75 degrees. This works very well when a screen frequency is used that is different from the screen frequency of the screen of 45 degrees by X % with 3<X<50.

Preferably the processor is adapted, e.g. may implement suitable software, so that the fourth ruling (Ruling4)=the second ruling (Ruling2)*X or (Ruling4)=the second ruling (Ruling2)/X with 1.03<X<1.50 and the fourth ruling (Ruling4)=the second ruling (ruling2)*M/(N*sqrt(2)) with N being an integer <10, and M being an integer <10.

The screen set comprising such four screens with screen angles at 15 degrees, 45 degrees, 75 degrees and 0 degrees can be rotated as a whole over a arbitrary angle This relation allows to derive a new enlarged supercell derived from the smaller supercell from the 3 screens geometry as in FIG. 15.

In the limit case with M=N=1, the deviation in screen ruling is 41% and the supercell that fits the interaction of the four screens has the same size as the supercell that fits the interaction of the first three screens. This embodiment of the implementation using a processor has the benefit that the periodicities resulting from the interaction between the separations cannot have a lower frequency than the initial supercell that fits the interaction of the first three screens. It is less preferred however as the interaction between the 45 degrees screen and the 0 degree screen is found to depend an a relative phase shift of these two screens as induced for example by misregistration errors resulting from fluctuations in the real life printing presses.

It is therefore more preferred that the processor is adapted, e.g. may implement suitable software, so that the fourth ruling (Ruling4)=the second ruling (Ruling2)*X or (Ruling4)=the second ruling (Ruling2)/X with 1.03<X<1.25 and the fourth ruling (Ruling4)=the second ruling (ruling2)*M/(N*sqrt(2)) with N being an integer >1 and <10, M being an integer >1 and <10.

An example of a non-rotated set with an fourth separation according to the features above is given ion the table below and complements the three screen set geometry is given below (line 8 of table 2):

Cyan 14.93 degrees—169.35 lpi
Magenta 75.07 degrees—169.35 lpi
Yellow 0 degrees—180 lpi
Black 45 degrees—169.71 lpi
For this example X=6.51% and M=3, N=2.

An example of a rotated set with an fourth separation according to the features above is given ion the table below and complements the three screen set geometry is given below (line 8 of table 4 and FIG. 19):

Cyan 21.27 degrees—187.02 lpi
Magenta 81.41 degrees—187.02 lpi
Yellow 6.34 degrees—198.78 lpi
Black 51.34 degrees—187.41 degrees,
For this example X=6.51% and M=3, N=2

A processor according to embodiments of the invention can be adapted as described above. It may include a microprocessor and memory as well as peripheral devices. The adaption of the processor can be the provision of suitable software that is written in a high level command language such as C or C++ and complied on a suitable compiler for the relevant target microprocessor or may be written in an interpretative language such as Java and compiled for a suitable virtual machine such as the Java Virtual machine for the particular microprocessor included within the processor. Accordingly, the present invention also includes a software product which when executed on a suitable computing device carries out any of the methods of the present invention.

For example a processor for use with the present invention may have a Central Processing Unit ("CPU"), such as an embedded microprocessor or a conventional microprocessor of which a Pentium processor supplied by Intel Corp. USA is only an example, and a number of other units interconnected via a bus system. The bus system may be any suitable bus system. The processor includes at least one memory. Memory may include any of a variety of data storage devices known to the skilled person such as random-access memory ("RAM"), read-only memory ("ROM"), non-volatile read/write memory such as a solid state memory or a hard disc as known to the skilled person. For example, processor may further include random-access memory ("RAM"), read-only memory ("ROM"), as well as a display adapter for connecting system bus to a video display, and an optional input/output (I/O) adapter for connecting peripheral devices to the system bus. The video display can be any suitable display device such as an OLED or an LCD display well-known in the art of mobile telephone hardware.

In addition, the processor engine can include a control program that resides within memory storage. The control program contains instructions that when executed on the CPU allow the processor to carry out the operations described with respect to any of the methods of the present invention.

The present invention also provides a computer program product for carrying out the method of the present invention and this can reside in any suitable memory. However, it is important that while the present invention has been, and will continue to be, that those skilled in the art will appreciate that the mechanisms of the present invention are capable of being distributed as a computer program product in a variety of forms, and that the present invention applies equally regardless of the particular type of signal bearing media used to actually carry out the distribution. Examples of computer readable signal bearing media include: recordable type media such as floppy disks and CD ROMs, DVD-ROM's, hard disks, USB sticks, solid state memory, tape memory, and transmission type media such as digital and analogue communication links.

The printing system for use with the present invention may use any suitable technology for printing an image onto a print medium using the image output of the screening system of the present invention. One form of printing system that is suitable has an image exposure system and a drum that is exposed with a spatial light modulator having an array of pixels. The pixels of the spatial light modulator are used to expose pixels on the drum. The image output of the screening system according to the present invention is used to prepare the image that is to be used to expose the drum. However the present invention is not limited to this form of printer and may find application in printing systems in general. The print medium may be any suitable medium such as paper or plastic sheet, cardboard, metal sheets, ceramic surfaces; etc.

Numerous other variations will also be apparent to one of ordinary skill in the art. It will therefore be appreciated by those of ordinary skill in the art that the invention can be embodied in other specific forms without departing from its spirit or essential character. The presently disclosed embodiments are therefore considered in all respects to be illustrative and not restrictive. The scope of the invention is indicated by the appended claims, and all changes which come within the meaning and range of equivalents thereof are intended to be embraced therein.

Appendix of Tables

TABLE 1

| i | P(A) | Q(B) | ratio | angle degrees |
|---|------|------|-------|---------------|
| 1 | 1 | 4 | 0.25 | 14.03624347 |
| 2 | 4 | 15 | 0.266667 | 14.93141718 |
| 3 | 15 | 56 | 0.267857 | 14.99507913 |
| 4 | 56 | 209 | 0.267943 | 14.99964671 |
| 5 | 209 | 780 | 0.267949 | 14.99997464 |
| 6 | 780 | 2911 | 0.267949 | 14.99999818 |
| 7 | 2911 | 10864 | 0.267949 | 14.99999987 |
| 8 | 10864 | 40545 | 0.267949 | 14.99999999 |
| 9 | 40545 | 151316 | 0.267949 | 15 |
| 10 | 151316 | 564719 | 0.267949 | 15 |

P(1) = 1
Q(1) = 4
P(i) = Q(i − i)
Q(i) = 4*Q(i − 1) − P(i − 1)

TABLE 2

| 1200 | k_x | k_y | | | | angleK | | | | | | |
|------|-----|-----|---|---|---|--------|---|---|---|---|---|---|
| | 5 | 5 | | | | 45 | | | | | | |

| tileB | tileA | tileC | tileD | K1 = K2 | angleM | angleC | lpiK | lpiC_M | tileAreaC | prot angle | ang err. | lpi err |
|-------|-------|-------|-------|---------|--------|--------|------|--------|-----------|------------|----------|---------|
| 20 | 0 | 1 | 3 | 2 | 71.57 | 18.43 | 169.71 | 189.74 | 400 | 18.435 | 3.435 | -20.031 |
| 40 | 0 | 1 | 5 | 4 | 78.69 | 11.31 | 169.71 | 152.97 | 1600 | 11.310 | 3.690 | 16.735 |
| 50 | 0 | 2 | 7 | 5 | 74.05 | 15.95 | 169.71 | 174.72 | 2500 | 15.945 | 0.945 | -5.017 |
| 30 | 0 | 1 | 4 | 3 | 75.96 | 14.04 | 169.71 | 164.92 | 900 | 14.036 | -0.964 | 4.781 |
| 80 | 0 | 3 | 11 | 8 | 74.74 | 15.26 | 169.71 | 171.03 | 6400 | 15.255 | 0.255 | -1.321 |
| 140 | 0 | 5 | 19 | 14 | 75.26 | 14.74 | 169.71 | 168.40 | 19600 | 14.744 | -0.256 | 1.304 |
| 190 | 0 | 7 | 26 | 19 | 74.93 | 15.07 | 169.71 | 170.06 | 36100 | 15.068 | 0.068 | -0.352 |
| 110 | 0 | 4 | 15 | 11 | 75.07 | 14.93 | 169.71 | 169.35 | 12100 | 14.931 | -0.069 | 0.351 |
| 300 | 0 | 11 | 41 | 30 | 74.98 | 15.02 | 169.71 | 169.80 | 90000 | 15.018 | 0.018 | -0.094 |
| 520 | 0 | 19 | 71 | 52 | 75.02 | 14.98 | 169.71 | 169.61 | 270400 | 14.982 | -0.018 | 0.094 |
| 710 | 0 | 26 | 97 | 71 | 75.00 | 15.00 | 169.71 | 169.73 | 504100 | 15.005 | 0.005 | -0.025 |
| 410 | 0 | 15 | 56 | 41 | 75.00 | 15.00 | 169.71 | 169.68 | 168100 | 14.995 | -0.005 | 0.025 |
| 1120 | 0 | 41 | 153 | 112 | 75.00 | 15.00 | 169.71 | 169.71 | 1254400 | 15.001 | 0.001 | -0.007 |
| 1940 | 0 | 71 | 265 | 194 | 75.00 | 15.00 | 169.71 | 169.70 | 3763600 | 14.999 | -0.001 | 0.007 |
| 2650 | 0 | 97 | 362 | 265 | 75.00 | 15.00 | 169.71 | 169.71 | 7022500 | 15.000 | 0.000 | -0.002 |
| 1530 | 0 | 56 | 209 | 153 | 75.00 | 15.00 | 169.71 | 169.70 | 2340900 | 15.000 | 0.000 | 0.002 |

TABLE 3

| 1200 | k_x | k_y | | | angleK | | | | | | | |
|---|---|---|---|---|---|---|---|---|---|---|---|---|
| | 4 | 3 | | | 36.8699 | | | | | | | |

| tileB | tileA | tileC | tileD | K1 = K2 | angleM | angleC | lpiK | lpiC_M | tileAreaC | prot angle | ang err. | lpi err |
|---|---|---|---|---|---|---|---|---|---|---|---|---|
| 14 | -2 | 1 | 3 | 2 | 63.43 | 10.30 | 240.00 | 268.33 | 200 | 18.435 | 3.435 | -28.328 |
| 28 | -4 | 1 | 5 | 4 | 70.56 | 3.18 | 240.00 | 216.33 | 800 | 11.310 | -3.690 | 23.667 |
| 35 | -5 | 2 | 7 | 5 | 65.92 | 7.82 | 240.00 | 247.10 | 1250 | 15.945 | 0.945 | -7.095 |
| 21 | -3 | 1 | 4 | 3 | 67.83 | 5.91 | 240.00 | 233.24 | 450 | 14.036 | -0.964 | 6.762 |
| 56 | -8 | 3 | 11 | 8 | 66.61 | 7.13 | 240.00 | 241.87 | 3200 | 15.255 | 0.255 | -1.868 |
| 98 | -14 | 5 | 19 | 14 | 67.13 | 6.61 | 240.00 | 238.16 | 9800 | 14.744 | -0.256 | 1.844 |
| 133 | -19 | 7 | 26 | 19 | 66.80 | 6.94 | 240.00 | 240.50 | 18050 | 15.068 | 0.068 | -0.498 |
| 77 | -11 | 4 | 15 | 11 | 66.94 | 6.80 | 240.00 | 239.50 | 6050 | 14.931 | -0.069 | 0.496 |
| 210 | -30 | 11 | 41 | 30 | 66.85 | 6.89 | 240.00 | 240.13 | 45000 | 15.018 | 0.018 | -0.133 |
| 364 | -52 | 19 | 71 | 52 | 66.89 | 6.85 | 240.00 | 239.87 | 135200 | 14.982 | -0.018 | 0.133 |
| 497 | -71 | 26 | 97 | 71 | 66.86 | 6.87 | 240.00 | 240.04 | 252050 | 15.005 | 0.005 | -0.036 |
| 287 | -41 | 15 | 56 | 41 | 66.87 | 6.86 | 240.00 | 239.96 | 84050 | 14.995 | -0.005 | 0.036 |
| 784 | -112 | 41 | 153 | 112 | 66.87 | 6.87 | 240.00 | 240.01 | 627200 | 15.001 | 0.001 | -0.010 |
| 1358 | -194 | 71 | 265 | 194 | 66.87 | 6.87 | 240.00 | 239.99 | 1881800 | 14.999 | -0.001 | 0.010 |
| 1855 | -265 | 97 | 362 | 265 | 66.87 | 6.87 | 240.00 | 240.00 | 3511250 | 15.000 | 0.000 | -0.003 |
| 1071 | -153 | 56 | 209 | 153 | 66.87 | 6.87 | 240.00 | 240.00 | 1170450 | 15.000 | 0.000 | 0.003 |

TABLE 4

| 1200 | k_x | k_y | | | angleK | | | | | | | |
|---|---|---|---|---|---|---|---|---|---|---|---|---|
| | 4 | 5 | | | 51.34019 | | | | | | | |

| tileB | tileA | tileC | tileD | K1 = K2 | angleM | angleC | lpiK | lpiC_M | tileAreaC | prot angle | ang err. | lpi err |
|---|---|---|---|---|---|---|---|---|---|---|---|---|
| 18 | 2 | 1 | 3 | 2 | 77.91 | 24.78 | 187.41 | 209.53 | 328 | 18.435 | 3.435 | -21.121 |
| 36 | 4 | 1 | 5 | 4 | 85.03 | 17.65 | 187.41 | 168.93 | 1312 | 11.310 | -3.690 | 18.481 |
| 45 | 5 | 2 | 7 | 5 | 80.39 | 22.29 | 187.41 | 192.95 | 2050 | 15.945 | 0.945 | -5.540 |
| 27 | 3 | 1 | 4 | 3 | 82.30 | 20.38 | 187.41 | 182.13 | 738 | 14.036 | -0.964 | 5.280 |
| 72 | 8 | 3 | 11 | 8 | 81.09 | 21.60 | 187.41 | 188.87 | 5248 | 15.255 | 0.255 | -1.458 |
| 126 | 14 | 5 | 19 | 14 | 81.60 | 21.08 | 187.41 | 185.97 | 16072 | 14.744 | -0.256 | 1.440 |
| 171 | 19 | 7 | 26 | 19 | 81.27 | 21.41 | 187.41 | 187.80 | 29602 | 15.068 | 0.068 | -0.389 |
| 99 | 11 | 4 | 15 | 11 | 81.41 | 21.27 | 187.41 | 187.02 | 9922 | 14.931 | -0.069 | 0.388 |
| 270 | 30 | 11 | 41 | 30 | 81.32 | 21.36 | 187.41 | 187.51 | 73800 | 15.018 | 0.018 | -0.104 |
| 468 | 52 | 19 | 71 | 52 | 81.36 | 21.32 | 187.41 | 187.30 | 221728 | 14.982 | -0.018 | 0.104 |
| 639 | 71 | 26 | 97 | 71 | 81.34 | 21.35 | 187.41 | 187.44 | 413362 | 15.005 | 0.005 | -0.028 |
| 369 | 41 | 15 | 56 | 41 | 81.35 | 21.34 | 187.41 | 187.38 | 137842 | 14.995 | -0.005 | 0.028 |
| 1008 | 112 | 41 | 153 | 112 | 81.34 | 21.34 | 187.41 | 187.42 | 1028608 | 15.001 | 0.001 | -0.007 |
| 1746 | 194 | 71 | 265 | 194 | 81.34 | 21.34 | 187.41 | 187.40 | 3086152 | 14.999 | -0.001 | 0.007 |
| 2385 | 265 | 97 | 362 | 265 | 81.34 | 21.34 | 187.41 | 187.41 | 5758450 | 15.000 | 0.000 | -0.002 |
| 1377 | 153 | 56 | 209 | 153 | 81.34 | 21.34 | 187.41 | 187.41 | 1919538 | 15.000 | 0.000 | 0.002 |

The invention claimed is:

1. A computer-implemented screening system for converting an image representation for a region comprising a continuous tone value for a given separation channel into a screened image representation value for the given separation channel for printed reproduction of images on a digital printing system, said screening system being capable of rendering more than two density levels at a device pixel level, said screening system comprising a processor, and
a first, a second, and a third separation screen and using precalculated rectangular screening tiles that define a spatially repetitive screening operation according to geometric clustered dot screen definitions for first, second and third separation screens,
said first, second and third separation screens being configured so they have different screen angles and each having rulings with at least two of the screen rulings being different by a finite amount and with at least one vector sum of two frequency components of one pair of screens being equal to at least one frequency component of the other screen or to a multiple or submultiple of said at least one frequency component of the other screen,
in which at least one of said three separation screens is simple rational, at least one of said three separation screens having target positions for centers of clustered dots, so that all the target positions for the centers of clustered dots for that separation screen have an identical relative position with respect to a device grid of addressable pixel positions,
wherein said three screens have an angular relation between them which is equivalent by a rotation of the entire screening system to the angular relation of a system of three screens with screen angles at 15 degrees+delta1, 45 degrees+delta2, 75 degrees+delta3, with delta1, delta2, delta3 when expressed in degrees satisfying the following relationships:

|delta1|<1 degree,

|delta2|<1 degree,

|delta3|<1 degree, wherein the screening operation for each of said three separation screens is arranged to convert an image representation for a region comprising a continuous tone value for a given separation channel into a screened image representation value for the given separation channel with a specific density value out of the available more than two density values for each addressable pixel position to be rendered.

2. The screening system of claim 1, wherein said screened image representation of said continuous tone value satisfying the constraint that when averaged over the pixels for a specific region more than 70% of the pixels have a density level, which is the minimum or maximum density value of said more than two density values.

3. The screening system of claim 1, wherein the screen rulings of each of said three separation screens satisfy the constraint: device resolution/8<screen ruling<device resolution/4.

4. The screening system of claim 1, wherein:

|delta1|<0.3 degree,

|delta2|<0.3 degree,

|delta3|<0.3 degree.

5. The screening system of claim 1, wherein the screening system is capable of rendering more than 4 density levels.

6. A screening method for printing images on a digital printing system using a screening system, said screening system being capable of rendering more than two density levels at a device pixel level, said screening system comprising a first, a second, and a third separation screen and using precalculated rectangular screening tiles that define a spatially repetitive screening operation according to geometric clustered dot screen definitions for first, second and third separation screens, the method comprising the steps of:

configuring said first, second and third separation screens so they have different screen angles and each having rulings with at least two of the screen rulings being different by a finite amount and with at least one vector sum of two frequency components of one pair of screens being equal to at least one frequency component of the other screen or to a multiple or submultiple of said at least one frequency component of the other screen, wherein at least one of said three separation screens is simple rational, at least one of said three separation screens having target positions for centers of clustered dots, meaning that all the target positions for the centers of clustered dots for that separation screen have an identical relative position with respect to a device grid of addressable pixel positions, setting said three screens to have an angular relation between them which is equivalent by a rotation of the entire screening system to the angular relation of a system of three screens with screen angles at 15 degrees+delta1, 45 degrees+delta2, 75 degrees+delta3, with delta1, delta2, delta3; when expressed in degrees satisfying the following relationships:

|delta1|<1 degree,

|delta2|<1 degree,

|delta3|<1 degree, wherein the screening operation for each of said three separation screens converts an image representation for a region comprising a continuous tone value for a given separation channel into a screened image representation value for the given separation channel with a specific density value out of the available more than two density values for each addressable pixel position to be rendered.

7. The screening method of claim 6, wherein said screened image representation of said continuous tone value satisfying the constraint that when averaged over the pixels for a specific region more than 70% of the pixels have a density level, which is the minimum or maximum density value of said more than two density values.

8. The screening method of claim 6, wherein the screen rulings of each of said three separation screens satisfy the constraint: device resolution/8<screen ruling<device resolution/4.

9. The screening method of claim 6, wherein:

|delta1|<0.3 degree,

|delta2|<0.3 degree,

|delta3|<0.3 degree.

10. The screening method of claim 6, wherein the screening system is capable of rendering more than 4 density levels.

11. A computer-implemented screening system for converting an image representation for a region comprising a continuous tone value for a given separation channel into a screened image representation value for the given separation channel for printed reproduction of images on a digital printing system, said screening system being capable of rendering more than two density levels at a device pixel level, said screening system comprising a processor, and a first, a second, a third and a fourth separation screen and using precalculated rectangular screening tiles that define a spatially repetitive screening operation according to geometric clustered dot screen definitions for first, second, third and fourth separation screens, said first, second, third and fourth separation screens being configured so they have different screen angles and each having a first ruling (Ruling1), a second ruling (Ruling2), a third ruling (Ruling3) and a fourth ruling (Ruling4) with at least two of the screen rulings being different by a finite amount and with at least one vector sum of two frequency components of one pair of screens being equal to at least one frequency component of one of the other screens or to a multiple or submultiple of said at least one frequency component of one of the other screens, in which at least one of said four separation screens is simple rational, at least one of said four separation screens having target positions for centers of clustered dots, so that all the target positions for the centers of clustered dots for that separation screen have an identical relative position with respect to a device grid of addressable pixel positions, wherein said four screens have an angular relation between them which is equivalent by a rotation of the entire screening system to the angular relation of a system of four screens with screen angles at 15 degrees+delta1, 45 degrees+delta2, 75 degrees+delta3, 0 degrees+delta4 with delta1, delta2, delta3, delta4 when expressed in degrees satisfying the following relationships:

|delta1|<1 degree,

|delta2|<1 degree,

|delta3|<1 degree,

|delta4|<1 degree, wherein the screening operation for each of said four separation screens converts an image representation for a region comprising a continuous tone value for a given separation channel into a screened image representation value for the given separation channel with a specific density value out of the available more than two density values for each addressable pixel position to be rendered.

12. The screening system of claim 11, wherein: the fourth ruling (Ruling4)=the second ruling (Ruling2)*X or (Ruling4)=the second ruling (Ruling2)/X with 1.03<X<1.50, *and* the fourth ruling (Ruling4)=the second ruling (Ruling2)*M/(N*sqrt(2)) with N being an integer <10, and M being an integer <10.

13. The screening system of claim 11, wherein: the fourth ruling (Ruling4)=the second ruling (Ruling2)*X or (Ruling4)=the second ruling (Ruling2)/X with 1.03<X<1.25, *and* the fourth ruling (Ruling4)=the second ruling (Ruling2)*M/(N*sqrt(2)) with N being an integer >1 and <10, and M being an integer >1 and <10.

14. A screening method for printed reproduction of images on a digital printing system capable of rendering more than two density levels at a device pixel level, said screening system comprising a first, a second, a third, and a fourth separation screen and using precalculated rectangular screening tiles that define a spatially repetitive screening operation according to geometric clustered dot screen definitions for first, second, third and fourth separation screens, configuring said first, second, third and fourth separation screens having different screen angles and each having a first ruling (Ruling1), a second ruling (Ruling2), a third ruling (Ruling3) and a fourth ruling (Ruling4) with at least two of the screen rulings being different by a finite amount and with at least one vector sum of two frequency components of one pair of screens being equal to at least one frequency component of one of the other screens or to a multiple or submultiple of said at least one frequency component of one of the other screens, wherein at least one of said four separation screens is simple rational, at least one of said four separation screens having target positions for centers of cluster dots, so that all the target positions for the centers of clustered dots for that separation screen have an identical relative position with respect to the device grid of addressable pixel positions, setting said four screens to have an angular relation between them which is equivalent by a rotation of the entire screening system to the angular relation of a system of four screens with screen angles at 15 degrees+delta1, 45 degrees+delta2, 75 degrees+delta3, 0 degrees+delta4 with delta1, delta2, delta3, delta4 when expressed in degrees satisfying the following relationships:

|delta1|<1 degree,

|delta2|<1 degree,

|delta3|<1 degree,

|delta4|<1 degree, wherein the screening operation for each of said three separation screens converts an image representation for a region comprising a continuous tone value for a given separation channel into a screened image representation value for the given separation channel with a specific density value out of the available more than two density values for each addressable pixel position to be rendered.

15. The screening method of claim 14, wherein:
the fourth ruling (Ruling4)=the second ruling (Ruling2)*X or (Ruling4)=the second ruling (Ruling2)/X with 1.03<X<1.50,
and
the fourth ruling (Ruling4)=the second ruling (Ruling2)*M/(N*sqrt(2)) with N being an integer <10, and M being an integer <10.

16. The screening method of claim 14, wherein:
the fourth ruling (Ruling4)=the second ruling (Ruling2)*X or (Ruling4)=the second ruling (Ruling2)/X with 1.03<X<1.25, *and*
the fourth ruling (Ruling4)=the second ruling (Ruling2)*M/(N*sqrt(2)) with N being an integer >1 and <10, and M being an integer >1 and <10.

17. A non-transitory machine readable signal storage media storing a software product that implements a screening system for converting an image representation for a region comprising a continuous tone value for a given separation channel into a screened image representation value for the given separation channel for printed reproduction of images when executed on a processor-based digital printing system, said screening system being capable of rendering more than two pixel density levels at a device pixel level, said screening system comprising a first, a second, and a third separation screen and using precalculated rectangular screening tiles that define a spatially repetitive screening operation according to geometric clustered dot screen definitions for first, second and third separation screens, the software providing said first, second and third separation screens having different screen angles and each has rulings with at least two of the screen rulings being different by a finite amount and with at least one vector sum of two frequency components of one pair of screens being equal to at least one frequency component of the other screen or to a multiple or submultiple of said at least one frequency component of the other screen, wherein at least one of said three separation screens is simple rational, at least one of said three separation screens having target position for centers of clustered dots, so that all the target positions for the centers of clustered dots for that separation screen have an identical relative position with respect to a device grid of addressable pixel positions, wherein said three screens have an angular relation between them which is equivalent by a rotation of the entire screening system to the angular relation of a system of three screens with screen angles at 15 degrees+delta1, 45 degrees+delta2, 75 degrees+delta3, with delta1, delta2, delta3 when expressed in degrees satisfying the relations

|delta1|<1 degree,

|delta2|<1 degree,

|delta3|<1 degree, wherein the screening operation for each of said three separation screens is arranged to convert an image representation for a region comprising a continuous tone value for a given separation channel into a screened image representation value for the given separation channel with a specific density value out of the available more than two density values for each addressable pixel position to be rendered.

18. A non-transitory machine readable signal storage media storing a software product that implements screening system for converting an image representation for a region comprising a continuous tone value for a given separation channel into a screened image representation value for the given separation channel for printed reproduction of images when executed on a processor-based digital printing system, said screening system being capable of rendering more than two pixel density levels at a device pixel level, said screening system comprising a first, a second, a third and a fourth separation screen and using precalculated rectangular screening tiles that define a spatially repetitive screening operation according to geometric clustered dot screen definitions for first, second, third and fourth separation screens, the software providing said first, second, third and fourth separation screens having different screen angles and each having a first ruling (Ruling2), a second ruling (Ruling2), a third ruling (Ruling3) and a fourth ruling (Ruling4) with at least two of the screen rulings being different by a finite amount and with at least one vector sum of two frequency components of one pair of screens being equal to at least one frequency component of one of the other screens or to a multiple or submultiple of said at least one frequency component of one of the other screens, wherein at least one of said four separation screens is simple rational, at least one of said four separation screens having target positions for centers of clustered dots, so that all the target positions for the centers of clustered dots for that separation screen have an identical relative position with respect to a device grid of addressable pixel positions, wherein said four screens have an angular relation between them which is equivalent by a rotation of the entire screening system to the angular relation of a system of three screens with screen angles at 15 degrees+delta1, 45 degrees+delta2, 75 degrees+delta3, 0 degrees+delta4 with delta1, delta2, delta3, delta4 when expressed in degrees satisfying the following relationships:

|delta1|<1 degree,

|delta2|<1 degree,

|delta3|<1 degree,

|delta4|<1 degree, wherein the screening operation for each of said four separation screens is arranged to convert an image representation for a region comprising a continuous tone value for a given separation channel into a screened image representation value for the given separation channel with a specific density value out of the available more than two density values for each addressable pixel position to be rendered.

* * * * *